(12) United States Patent
Xu et al.

(10) Patent No.: US 12,435,757 B1
(45) Date of Patent: Oct. 7, 2025

(54) WIND POWER MAIN-SHAFT SLIDING BEARING WITH BIDIRECTIONAL STRESSES AND WIND POWER GENERATION SYSTEM

(71) Applicant: Jiangsu Zhenjiang New Energy Equipment Co., Ltd., Jiangyin (CN)

(72) Inventors: Jianhua Xu, Wuxi (CN); Zhen Hu, Wuxi (CN)

(73) Assignee: JIANGSU ZHENJIANG NEW ENERGY EQUIPMENT CO., LTD., Wuxi (CN)

( * ) Notice: Subject to any disclaimer, the term of this patent is extended or adjusted under 35 U.S.C. 154(b) by 0 days.

(21) Appl. No.: 19/239,986

(22) Filed: Jun. 17, 2025

Related U.S. Application Data

(63) Continuation of application No. PCT/CN2024/128027, filed on Oct. 29, 2024.

(30) Foreign Application Priority Data

Jul. 30, 2024 (CN) .......................... 202411025902.0

(51) Int. Cl.
 *F16C 17/10* (2006.01)
 *F16C 33/10* (2006.01)
(52) U.S. Cl.
 CPC ............ *F16C 17/10* (2013.01); *F16C 33/103* (2013.01); *F16C 2360/31* (2013.01)
(58) Field of Classification Search
 CPC .. F16C 17/10; F16C 33/1025; F16C 33/1045; F16C 33/106; F16C 33/108; F16C 2360/31; F03D 80/70
 See application file for complete search history.

(56) References Cited

U.S. PATENT DOCUMENTS 10,006,486 B2 6/2018 Wojtkowski et al.
10,935,072 B2 3/2021 Lüneburg et al.
(Continued)

FOREIGN PATENT DOCUMENTS

CN 103363116 A 10/2013
CN 107405656 A 11/2017
(Continued)

OTHER PUBLICATIONS

International Search Report, International Appl. No. PCT/CN2024/128027, Mar. 31, 2025, issued by the China National Intellectual Property Administration (ISA/CN), Beijing, China.
(Continued)

*Primary Examiner* — Alan B Waits
(74) *Attorney, Agent, or Firm* — Central California IP Group, P.C.; Andrew D. Fortney

(57) ABSTRACT

A wind power main-shaft sliding bearing with bidirectional stresses and a wind power generation system are disclosed. The wind power main-shaft sliding bearing includes an outer ring, an inner ring and a tile block. The outer ring has an isosceles trapezoidal cross-section where the inner ring slides. The inner ring has a trapezoidal groove matching the outer ring shape. Symmetrical chutes are in two inner sloping faces of the trapezoidal groove. The tile block is in a cavity between the chute and the outer ring. The face of the tile block near the inner ring is spherical. The tile block separates first and second oil cavities, respectively near the outer and inner rings. Even when the sliding bearing is stressed with a load that deforms the inner ring, the tile block automatically adjusts the tilting angle, thereby avoiding tilting the outer ring due to operating pressure loss.

10 Claims, 17 Drawing Sheets

(56) References Cited

U.S. PATENT DOCUMENTS

| | | | |
|---|---|---|---|
| 12,196,184 B2 | 1/2025 | Hoelzl et al. | |
| 2016/0258483 A1 | 9/2016 | Wojtkowski et al. | |
| 2017/0082141 A1* | 3/2017 | Mtauweg | F16C 17/20 |
| 2020/0088234 A1* | 3/2020 | Lüneburg | F16C 32/064 |
| 2021/0388820 A1 | 12/2021 | Hoelzl | F16C 33/1085 |
| 2021/0396216 A1* | 12/2021 | Hager | F16C 35/02 |
| 2021/0396271 A1* | 12/2021 | Hager | F03D 80/70 |
| 2022/0010784 A1* | 1/2022 | Hoelzl | F16C 33/74 |
| 2022/0243706 A1* | 8/2022 | Hoelzl | F16C 25/02 |

FOREIGN PATENT DOCUMENTS

| | | |
|---|---|---|
| CN | 110402335 A | 11/2019 |
| CN | 212094364 U | 12/2020 |
| CN | 113167324 A | 7/2021 |
| CN | 118548286 A | 8/2024 |
| JP | H11223218 A | 8/1999 |
| WO | 2019115202 A1 | 6/2019 |

OTHER PUBLICATIONS

Written Opinion, International Appl. No. PCT/CN2024/128027, Mar. 31, 2025, issued by the China National Intellectual Property Administration (ISA/CN), Beijing, China.

\* cited by examiner

WIND POWER MAIN-SHAFT SLIDING BEARING WITH BIDIRECTIONAL STRESSES AND WIND POWER GENERATION SYSTEM

CROSS-REFERENCE TO RELATED APPLICATIONS

This application is a continuation of International Pat. Appl. No. PCT/CN2024/128027, filed on Oct. 29, 2024, which claims the benefit of Chinese Pat. Appl. No. 202411025902.0, filed on Jul. 30, 2024, both of which are incorporated herein by reference as if fully set forth herein.

TECHNICAL FIELD

The present invention relates to the technical field of wind power sliding bearings, and specifically to a wind power main-shaft sliding bearing with bidirectional stresses and a wind power generation system including the same.

BACKGROUND

A bearing is a core part of a wind power apparatus. Because a wind driven generator set is located in an outdoor wilderness or the sea for a long time, the operation environment can be harsh. Bearing performance requirements are very high. At the same time, because the bearing should be maintenance-free for 20 years, leading to challenges in design and domestic production, which primarily relies on imports.

Due to high rotary accuracy, high rigidity, smooth rotation, no vibration and other characteristics, hydrostatic sliding bearings are currently one of the main focuses in the application of bearings for wind power main-shaft bearings. However, because the load on the wind power main-shaft bearings is large, in operation, the sliding face of the hydrostatic sliding bearing, especially an inner ring of the bearing, may deform, which reduces the contact accuracy between the bearing bush (also known as a tile block) and an outer ring of the bearing, making it difficult to establish static pressure. In a serious case, this can result in a loss of operating pressure, leading to the tilting of the bearing outer ring and causing issues such as uneven air gaps between the stator and rotor of the wind turbine. Therefore, there is an urgent need for another structural form of the hydrostatic sliding bearing to solve the problem.

SUMMARY

A first aspect of the present invention is to solve the above technical problem. The present invention provides a sliding bearing, which is conducive to the uniform distribution of a hydrostatic load. Further, the tilt or angle of the tile block(s) can be adjusted in real time when the inner ring and the outer ring of the bearing move relative to each other, thereby avoiding tilting the outer ring due to a loss in operating pressure. The sliding bearing is particularly suitable for a wind driven generator. Main concepts are as follows:

A wind power main-shaft sliding bearing with bidirectional stresses includes an outer ring, an inner ring and tile blocks. The outer ring has a cross-section with an isosceles trapezoidal shape where the inner ring slides along it. The inner ring has a groove with a trapezoidal cross-section matching the shape of the outer ring at the interface of the outer ting and the inner ring. The trapezoidal groove has sloping faces with symmetrical chutes therein. The tile blocks are each in a corresponding chute, between the inner ring and the outer ring. The tile block has a spherical face near the inner ring and a working face facing the outer ring. The tile block separates a first oil cavity and a second oil cavity. The first oil cavity is near the outer ring. The second oil cavity is near the inner ring. The first oil cavity includes a lubricant. The second oil cavity includes an oil, preferably at a high pressure. The inner ring includes a first oil supply passage and a second oil supply passage. The first oil supply passage is in communication with the first oil cavity. The second oil supply passage is in communication with the second oil cavity. Therefore, the lubricant and the oil are supplied to the first oil cavity and the second oil cavity, respectively. In this solution, under the pressure of the oil on the spherical face of the tile block, the working face of the tile block automatically fits with the sliding face of the outer ring of the bearing, to form a hydrostatic pressure (e.g., between the working face of the tile block and the outer ring). Further, good oblique support can be provided to the outer ring of the bearing, so that the bearing can be subject to radial and axial forces at the same time and rotate smoothly, which is suitable for wind power main-shaft bearings. In this solution, the tile block, the chute, and the high-pressure oil in the chute can form a tiltable tile adjustment mechanism. Even when subjected to a large load and deformation of the inner ring of the bearing, because the spherical face of the tile block may be under an extrusion effect of the high-pressure oil, the tilt angle of the tile block can automatically adjust, so that the corresponding surface thereof always fits with the sliding face of the outer ring. Therefore, a good fitting precision between the tile block and the sliding face is maintained, and the hydrostatic load is distributed uniformly. When the inner ring and the outer ring move relative to each other, the tilt angle of the tile block can adjust, avoiding tilting the outer ring of the bearing due to a loss of operating pressure. When used as a bearing on a main shaft of a wind driven generator, the sliding bearing can allow air gaps between the wind driven generator stator and the wind driven generator rotor to always maintain uniformity. In addition, when a tile block wears out, which can cause or increase a gap between the outer ring sliding face and the tile block, the position of the tile block can be adjusted by the high-pressure oil in the second oil cavity to compensate for the gap or its increase. It is ensured that the sliding face and the tile block can maintain a designed gap size for a long period of time, so as to automatically compensate for wear. There is no need to replace the tile block during use, ensuring that the sliding bearing can operate steadily for a long period of time.

A second aspect of the present invention is to solve the following problems: A scaling member between the inner ring and the outer ring may wear out and produce a gap after a long period of time of use, which reduces sealing and makes it difficult to replace the scaling member. In the second aspect, an annular shell plate is fixed and/or connected to an end face of the outer ring. One or more annular grooves are at the edge or circumference of the inner ring. An elastic circular body is in each annular groove. The elastic circular body is (in the absence of another material therein) hollow. An oil inlet is in a side of the elastic circular body. An oil-replenishing pipe is fixed and/or connected to the oil inlet of the elastic circular body. The oil-replenishing pipe is in communication with the cavity of the elastic circular body. A pressurized oil is injected with through the oil-replenishing pipe into the cavity of the elastic circular body. The elastic circular body expands under the pressure of the oil in the cavity, and tightly fits with the annular shell plate to form a seal between the inner ring and the annular shell plate. When the elastic circular body wears out during normal use, the pressurized oil can be replenished in the elastic circular body through the oil-replenishing pipe to increase the oil pressure so that the elastic circular body expands again and tightly fits with the annular shell plate to efficiently seal the bearing again without disassembly and replacement.

To realize the sealing effect, further, a retaining circle may be fixed and/or connected to the end face (e.g., outer surfaces) of the inner ring (e.g., along its circumference). A through hole is in the retaining circle at the position of the oil-replenishing pipe. The oil-replenishing pipe passes through the through hole. The oil-replenishing pipe has a thread on an external surface thereof. The oil-replenishing pipe is tightly locked and/or fixed to the retaining ring using a nut on the external thread. The retaining ring restricts and/or restrains the elastic circular body, so that the elastic circular body expands toward the annular shell plate, thereby improving the scaling.

Further, the oil-replenishing pipe has a scaling circular body at an end thereof. The sealing circular body is in the cavity of the elastic circular body and contacts an inner wall of the elastic circular body. The sealing circular body can tightly contact the inner wall at the oil inlet of the elastic circular body under the pressure of the oil in the cavity, to avoid leakage of the pressurized oil in the cavity.

A third aspect of the present invention is to solve the problem of delivering a lubricant to the first oil cavity with low energy consumption. In this aspect, each of the tile blocks is separately configured with a set of first oil supply passages. The first oil supply passage in this aspect includes a first flow channel in the inner ring, a second flow channel in the tile block, and a communicating component. When multiple second flow channels are present, the second flow channels may be radially arranged or distributed in the tile block. One end of the second flow channel(s) is in communication with the communicating component on the spherical face of the tile block, and another end of the second flow channel(s) opens through the working face of the tile block and is in communication with the first oil cavity. The communicating component is in the second oil cavity and is in communication with the first flow channel. The communicating component is flexible. The sliding bearing not only meets the requirement that the tile block move relative to the inner ring, but also can directly deliver the lubricant to each of the first oil cavities, which is convenient and has lower energy consumption.

A fourth aspect of the present invention is to solve the problem on how to further improve the stability and durability of a hydrostatic oil film in the first oil cavity. In this aspect, the tile block has a unidirectional structure (e.g., a check valve). The unidirectional structure includes a sliding channel, a slider, a spring, and a joint adapted to the sliding channel. The sliding channel and the second flow channel are in the tile block. The sliding channel has one end open through the spherical face of the tile block, and another end that does not pass through the tile block. The second flow channel has one end open through the working face of the tile block and in communication with the first oil cavity, and another end in communication with the sliding channel. The joint has one end connected to the sliding channel and another end connected to the communicating component. The spring and the slider are both in the sliding channel. The spring is between the bottom of the sliding channel and the slider. The slider is between the spring and the joint. The slider is adapted to and movable along the sliding channel.

Initially (e.g., in an initial state), the spring presses the slider against the joint, and the slider blocks the second flow channel. Therefore, the lubricant can be only unidirectionally conveyed to the first oil cavity. Further, during use of the bearing, the slider can close the second flow channel, which not only prevents the lubricant in the first oil cavity from flowing back out due to the internal pressure in the first oil cavity and/or the first supply passage, but also provides a more stable and reliable support and counterforce for the lubricant in the first oil cavity, and ensures that the hydrostatic oil film in the first oil cavity is durable and stable.

A fifth aspect of the present invention is to solve the following problem: The lubricant in the first oil cavity is easily contaminated by the high-pressure oil in the second oil cavity, which leads to the deterioration of the lubricating effect and an increase in wear (e.g., at the interface between the outer and inner rings). In this aspect, the wind power main-shaft sliding bearing further includes a follower member and an elastic member. The follower member includes a first circular body adapted to the chute, a second circular body adapted to the spherical face of the tile block, and a support circle. The first circular body and the second circular body are connected to opposed sides or edges of the support circle. The first circular body, the second circular body, and the support circle jointly enclose an annular receiving cavity. The first circular body includes a first sealing face fitting an inner surface of the chute. The side of the first circular body away from the first sealing face is beveled or curved. The second circular body includes a second sealing face fitting the spherical face of the tile block. The follower member is inside the chute. The first sealing face fits with the inner surface of the chute. The second sealing face fits with the spherical face of the tile block. The elastic member is inside the chute. The elastic member has an upper end in the receiving cavity of the follower member, and contacts (i) the support circle or (ii) the first circular body and the second circular body. The elastic member has a lower end contacting the bottom of the chute. The follower member is in the second oil cavity and can always fit with the tile block under the pressure of the oil and a preloading force of the elastic member, which significantly improves the scaling between the tile block and the chute, and effectively prevents the high-pressure oil from leaking into the first oil cavity, thereby contaminating the lubricant.

A sixth aspect of the present invention is to eliminate the risk of unreliability or instability that may be brought about by the communicating component. In this aspect, the sliding bearing includes a guide seat. The guide seat is adapted to the chute. The guide seat and the chute may form a moving pair in a depth direction of the chute. The second oil cavity is between the lower end of the guide seat and the chute. The guide seat may have an inner concave or spherical face adapted to the spherical face of the tile block. The tile block is mounted on the inner concave face of the guide seat. The spherical face of the tile block and the inner concave face of the guide seat form a spherical face pair. The first oil supply passage includes the first flow channel in the inner ring, a vertical flow channel in a wall of the chute, a transverse flow channel in the guide seat, a circular groove in the inner concave face, and the second flow channel in the tile block. The vertical flow channel may be oriented along the depth direction of the chute. The first flow channel is in communication with the vertical flow channel. The transverse flow channel has one end open through the side wall of the guide seat to form an inlet in the side wall of the guide seat. The inlet corresponds to the vertical flow channel, and is in communication with the vertical flow channel. The circular groove is in the center of the inner concave face. The transverse flow channel has another end in communication with the circular groove. Ends of the second flow channel open through the working face and the spherical face of the tile block, respectively. The second flow channel is in communication with the circular groove. In this solution, the guide seat adapted to the tile block and the chute is added so that the tile block can move along the chute in a straight line in a more stable and high-precision manner to compensate for the amount of wear of the tile block. The relevant flow channel(s) of the first oil supply passage can be directly processed on the guide seat, avoiding placing the communicating component in the second oil cavity, effectively eliminating the risk of unreliability or instability that may be brought about by the communicating component, and allowing the sliding bearing to have a lower failure rate and be more reliable and stable. There is no need to replace parts during use of the bearing.

To solve the problem that the first oil cavity may always be in communication with the circular groove, the tile block may include at least four second flow channels. One of the second flow channels is at a central position of the tile block. The remaining second flow channels are uniformly and circumferentially distributed around the second flow channel. Spacings between the second flow channels gradually increase from the guide seat to the first oil cavity. This sliding bearing ensures that the second flow channel is always in communication with the circular groove, reduces any requirement for the circular groove to have a larger area, and allows the lubricant to enter and be more evenly dispersed into the first oil cavity, which is conducive to improving the uniformity of the hydrostatic oil film.

Further, the vertical flow channel may have an upper end open through the outer annular face of the inner ring. The guide seat may further include a limiting protrusion on a side thereof, adapted to the vertical flow channel. The limiting protrusion is movably constrained to the vertical flow channel. The vertical flow channel cooperates with the limiting protrusion, which plays the dual roles of limiting and constraining the guide seat and blocking the upper end of the vertical flow channel.

A seventh aspect of the present invention is to solve the following problems: In use, the lubricant in the first oil cavity may be easily and/or constantly lost through gaps between the guide seat and the chute and/or between the vertical flow channel and the limiting protrusion, which greatly reduces the duration and stability of the lubricant film in the first oil cavity. In this aspect, a unidirectional structure (e.g., a check valve) may be in the transverse flow channel of the guide seat. The unidirectional structure includes a sliding channel, a communicating passage, a slider, a spring, and a limiting member. The sliding channel is in the guide seat. The sliding channel has one end open through a side wall of the guide seat to form the inlet, and another end that does not pass through the guide seat. The communicating passage has one end in communication with the circular groove, and another end connected to the sliding channel. The limiting member is cylindrical. The limiting member is threadedly connected to the inlet of the sliding channel. The spring and the slider are both inside the sliding channel. The spring is between the bottom of the sliding channel and the slider. The slider is between the spring and the limiting member. The slider and the sliding channel are a moving pair. Initially, the spring presses the slider against the limiting member, and the slider blocks the communicating passage. This structure can prevent the lubricant from continuously leaking out from the gaps between the guide seat and the chute and between the vertical flow channel and the limiting protrusion, and can also provide a more stable and reliable support and counterforce for the lubricant in the first oil cavity, ensuring a durable and stable hydrostatic oil film in the first oil cavity.

An eighth aspect of the present invention is to solve the following problem: The lubricant in the first oil cavity may be easily contaminated by the high-pressure oil (e.g., in the second oil cavity), which leads to deterioration of the lubricating effect and an increase in wear. In this aspect, an elastic member may be in the chute. The guide seat may have a spherical (convex) lower end or face. The follower member is at the bottom of the guide seat. The follower member includes a first circular body adapted to the chute, a second circular body adapted to the spherical face of the guide seat, and a support circle. The first circular body and the second circular body are connected to opposed sides or edges of the support circle, respectively. The first circular body, the second circular body, and the support circle jointly enclose an annular receiving cavity. The first circular body includes a first sealing face fitting the inner surface of the chute. The first circular body may have a beveled or curved face opposite or away from the first sealing face. The second circular body includes a second scaling face fitting the spherical face of the guide seat. The first sealing face fits with the inner surface of the chute. The second sealing face fits with the spherical face of the guide seat. The elastic member has an upper end in the receiving cavity of the follower member, contacting (i) the support circle or (ii) the first circular body and the second circular body, and a lower end contacting the bottom of the chute. The follower member is in the second oil cavity. The follower member can compensate for wear over a long period of time by the pressure of the high-pressure oil and a preloading force of the elastic member thereon, thereby ensuring that the follower member always fits with the guide seat and that the tile block self-adapts and auto-corrects, which can significantly improve the sealing between the tile block and the chute, effectively prevent the high-pressure oil from leaking into the first oil cavity and contaminating the lubricant, and improve the service life of the follower member and avoiding replacement (e.g., of various parts of the bearing).

A ring-shaped protrusion may be on the inside and/or the lower end of the second circular body. The ring-shaped protrusion forms an annular slot in the second circular body. A circular spring may be in the annular slot. The circular ring further tightens the lower end of the second circular body and increases the fitting pressure between the second circular body and the guide seat, which is conducive to improving sealing.

A wind power generation system includes a power generation module. The power generation module includes a wind driven generator stator, a wind driven generator rotor, and the sliding bearing. The wind driven generator stator and the wind driven generator rotor are connected to the sliding bearing, respectively, and rotate relative to each other via the sliding bearing.

Compared with the prior art, a wind power main-shaft sliding bearing with bidirectional stresses and a wind power generation system provided by the present invention can form a tiltable tile adjustment mechanism therein. Even when subjected to a large load and deformation of the inner ring of the bearing, because the spherical face of the tile block is under a high oil pressure, the tilt angle of the tile block can automatically adjust, so that the corresponding surface thereof always fits with the sliding face on an outer ring. Therefore, a good fitting precision between the tile block and the sliding face is maintained, and the hydrostatic load is distributed uniformly. When the inner ring and the outer ring move relative to each other, the tilt angle of the tile block can also adjust, thereby avoiding tilting the outer ring of the bearing due to a loss of operating pressure, allowing stable rotation, and allowing air gaps between the wind driven generator stator and the wind driven generator rotor to maintain uniformity.

Figure 1:
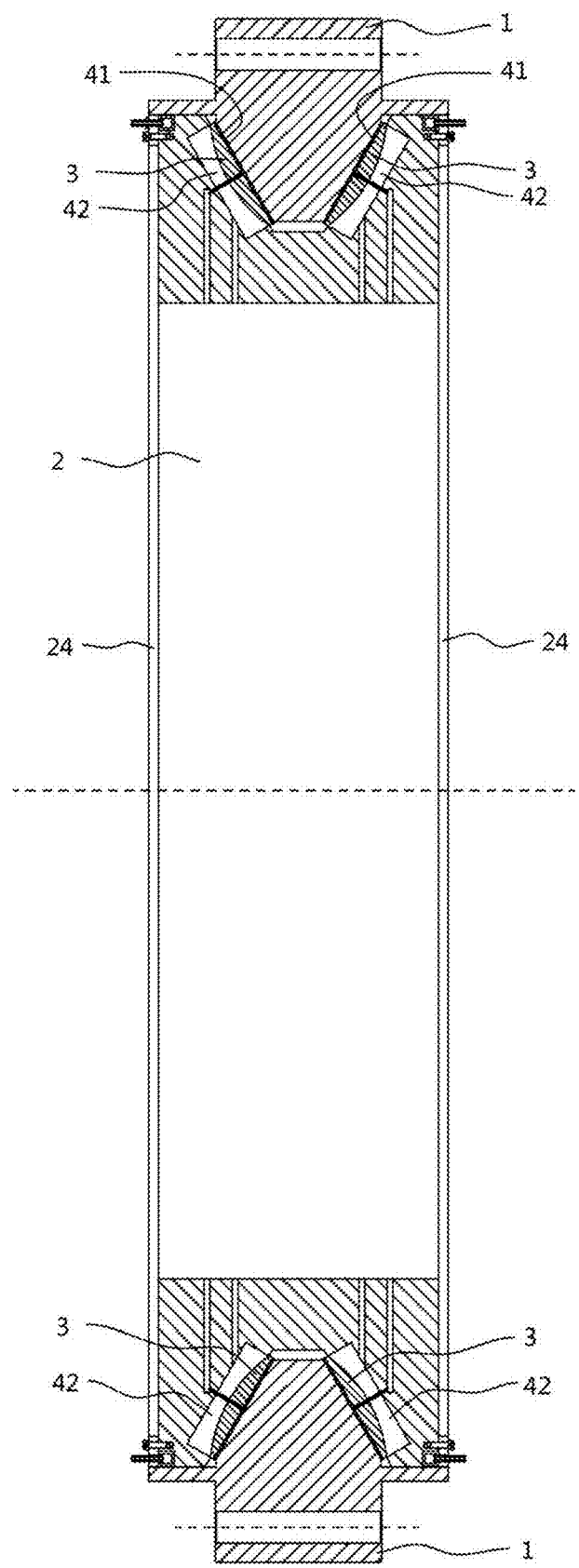
FIG. 1 shows a schematic diagram of the overall structure of a first sliding bearing provided in Example 1 of the present invention.

The description of reference signs in the figures: outer ring 1, sliding face 12, annular shell plate 13; inner ring 2, chute 21, elastic member 22, annular groove 23, retaining ring 24, hexagonal socket cylindrical head screw 25; tile block 3, working face 31, spherical face 32; first oil cavity 41, second oil cavity 42; first oil supply passage 5, first flow channel 51, second flow channel 52, communicating component 53, vertical flow channel 54, transverse flow channel 55, circular groove 56; second oil supply passage 6; sliding channel 71, slider 72, conical head 721, spring 73, joint 74, communicating passage 75, limiting member 76, conical hole 761, balancing passage 79; follower member 8, first circular body 81, first sealing face 811, beveled face 812, second circular body 82, second sealing face 821, annular protrusion 822, support circle 83, receiving cavity 84, base body 85, elastic layer 86, circular spring 87; guide seat 9, inner concave face 91, limiting protrusion 92; elastic circular body 10, hollow cavity 101, oil-replenishing pipe 102, sealing circular body 103, external thread 104, nut 105.

DETAILED DESCRIPTION OF EMBODIMENTS

Example 1

Figure 2:
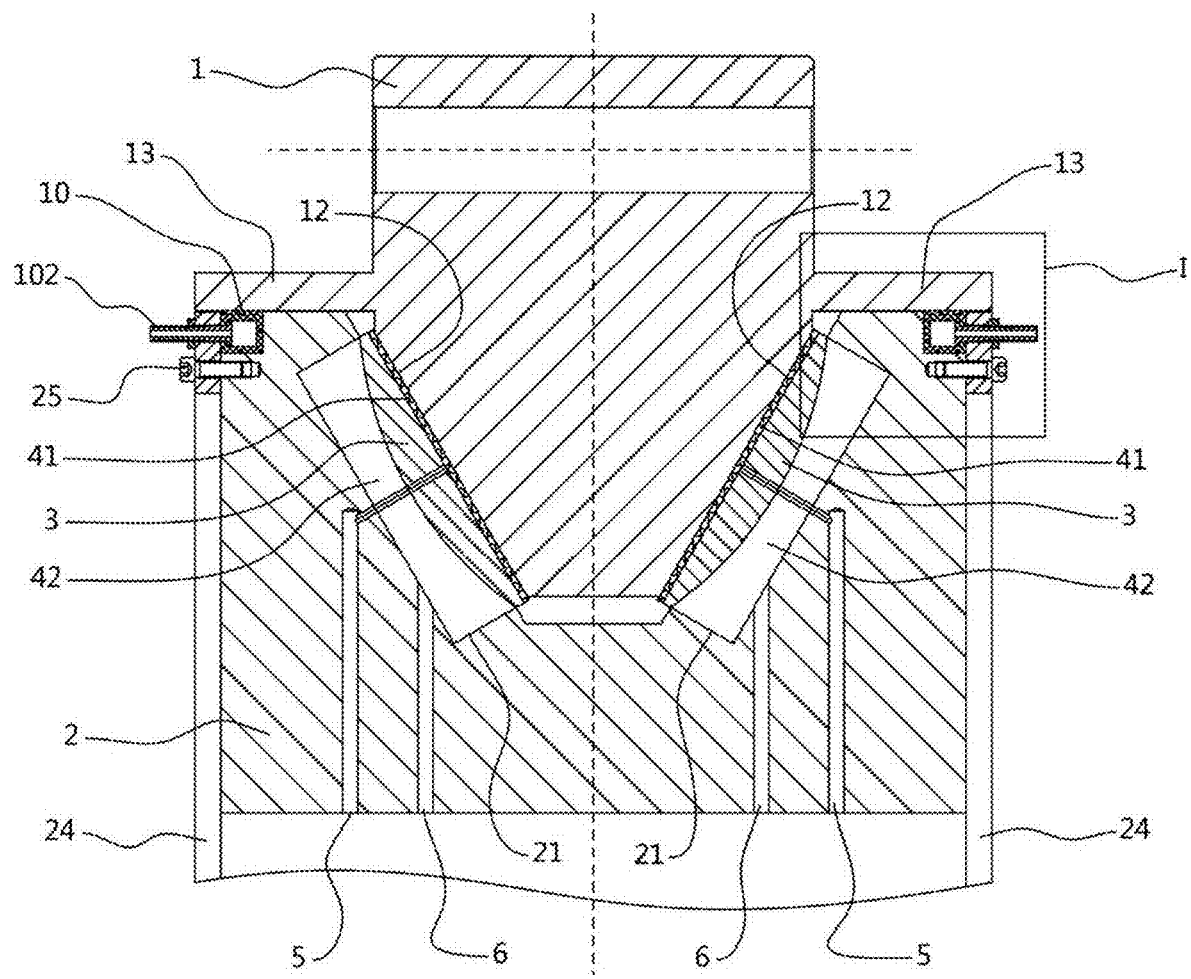
FIG. 2 shows a schematic diagram of a partial cross-section of the first sliding bearing provided in Example 1 of the present invention.

Referring to FIGS. 1-2, this example provides a wind power main-shaft sliding bearing with bidirectional stresses, including an outer ring 1, an inner ring 2, and a tile block 3. Where the inner ring 2 slides on the outer ring 1, the outer ring 1 has a cross-section with an isosceles trapezoidal shape. As shown in FIGS. 1-2, the inner ring 2 has a groove therein with a trapezoidal cross-section, matching the shape of the outer ring 1 at the corresponding position or interface. Symmetrical chutes 21 are in the two inner sloping faces 812 of the trapezoidal groove, respectively. A tile block 3 is in each of the chutes 21, in a cavity between the chute 21 and the inner-facing surface of the outer ring 1. The surface of the tile block 3 facing the inner ring is curved (convex) or spherical. For ease of description, the surface of the outer ring 1 facing the tile block 3 is called the sliding face 12. As can be seen in FIGS. 1 and 2, the sliding face 12 is a portion of the inner surface of the outer ring 1. The tile block 3 separates a first oil cavity 41 and a second oil cavity 42. The first oil cavity 41 is near the outer ring 1. The second oil cavity 42 is near the inner ring 2. As shown in FIG. 1, a lubricant is injected into the first oil cavity 41 so as to form an oil film between the sliding face 12 of the outer ring 1 and the tile block 3. In addition, oil is injected at high pressure into the second oil cavity 42. The pressure of the oil in the second oil cavity 42 supports the tile block 3. For ease of description, the surface on the tile block 3 corresponding to the first oil cavity 41 is referred to as the working face 31 of the tile block 3, which will not be further described in the following text.

Referring to FIG. 2, a first oil supply passage 5 and a second oil supply passage 6 are in the inner ring 2. The first oil supply passage 5 is in communication with the first oil cavity 41. The second oil supply passage 6 is in communication with the second oil cavity 42. In implementation, the first oil supply passage 5 is connected to an external lubricating oil pump system to provide the lubricant for the first oil cavity 41. The second oil supply passage 6 is connected to an external high-pressure oil pump system to provide the oil at a desired pressure for the second oil cavity 42.

Figure 4:
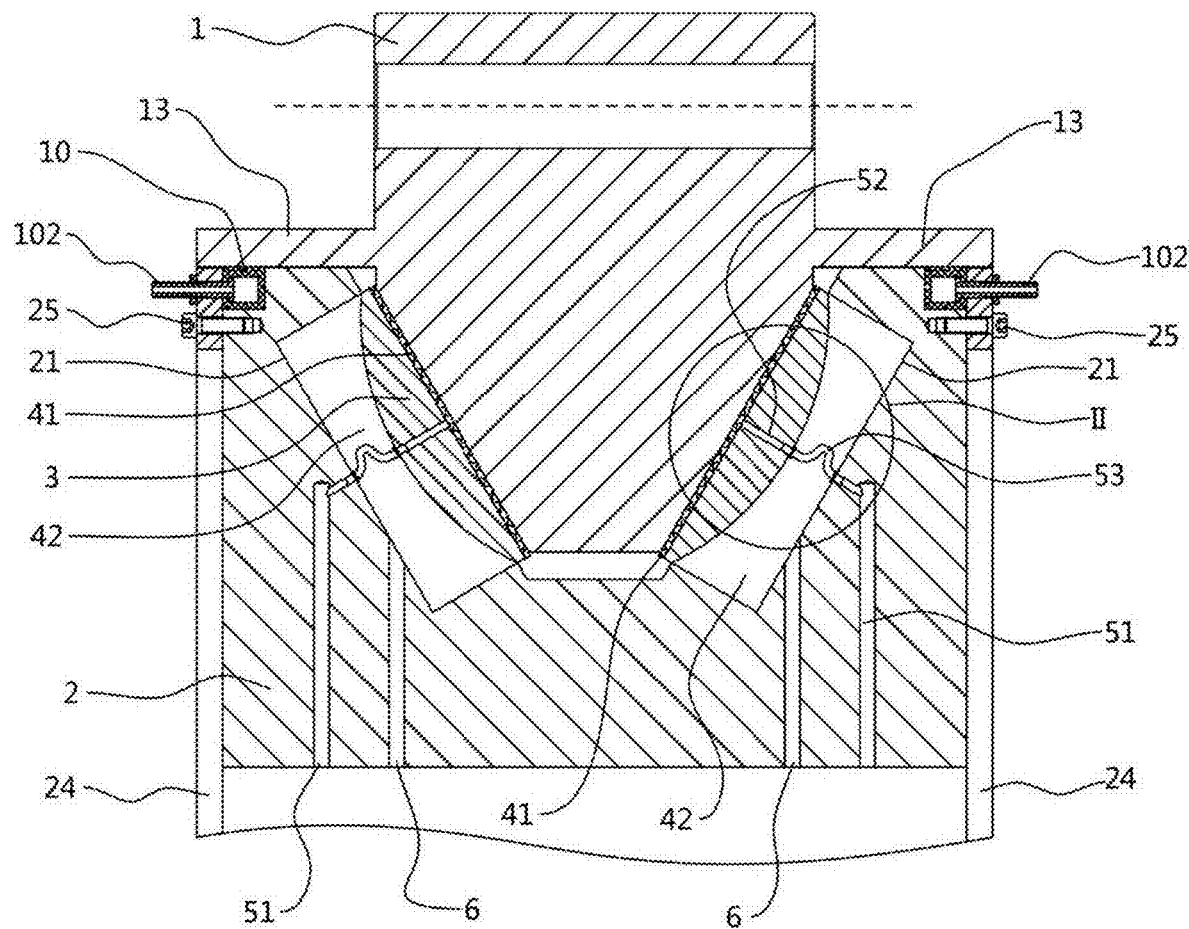
FIG. 4 shows a schematic diagram of a partial cross-section of another sliding bearing provided in Example 1 of the present invention.

In one implementation, the first oil supply passage 5 may be a flow channel constructed in a middle position of the inner ring 2. The flow channel is in communication with a gap between the inner ring 2 and the outer ring 1. The gap is in communication with the first oil cavity 41. However, with this implementation, the lubricant enters the first oil cavity 41 with difficulty under high-load conditions, resulting in a higher delivery pressure, higher energy consumption, and uneven distribution of the lubricant. To overcome these drawbacks, in another solution, each of the first oil supply passages 5 includes a first flow channel 51 in the inner ring 2, a second flow channel 52 in the tile block 3, and a communicating component 53 communicating the first flow channel 51 with the second flow channel 52 (see, e.g., FIG. 5). As shown in FIG. 4, the communicating component 53 is flexible. When in use, there may be a large pressure difference between the inside and outside of the communicating component 53. Therefore, the communicating component 53 can preferentially adopt a bellows with a higher yield strength, which can meet the needs of bending and communication, prevent the communicating component 53 from being deformed or crushed by the pressure of the high-pressure oil inside the second oil cavity 42, and improve the stability and reliability of the communicating component 53. In one implementation, the second flow channel 52 is arranged in a radial direction of the spherical face 32 of the tile block 3. One end of the second flow channel 52 is in communication with the communicating component 53 on the spherical face 32 of the tile block 3, and the other end of the second flow channel passes through the working face 31 of the tile block 3 and is in communication with the first oil cavity 41 to directly input the lubricant into the first oil cavity 41, which is conducive to the formation of a more even oil film inside the first oil cavity 41, resulting in more uniform distribution of a hydrostatic pressure. The second flow channel 52 can preferentially be at a center of the tile block 3. As shown in FIG. 4, the lubricant can be uniformly dispersed along the center of the tile block 3 in all directions, which is conducive to realizing a more uniform and dispersed oil film, and can effectively prevent dry friction and stress concentration caused by a local lubricant film that is too thin.

Figure 5:
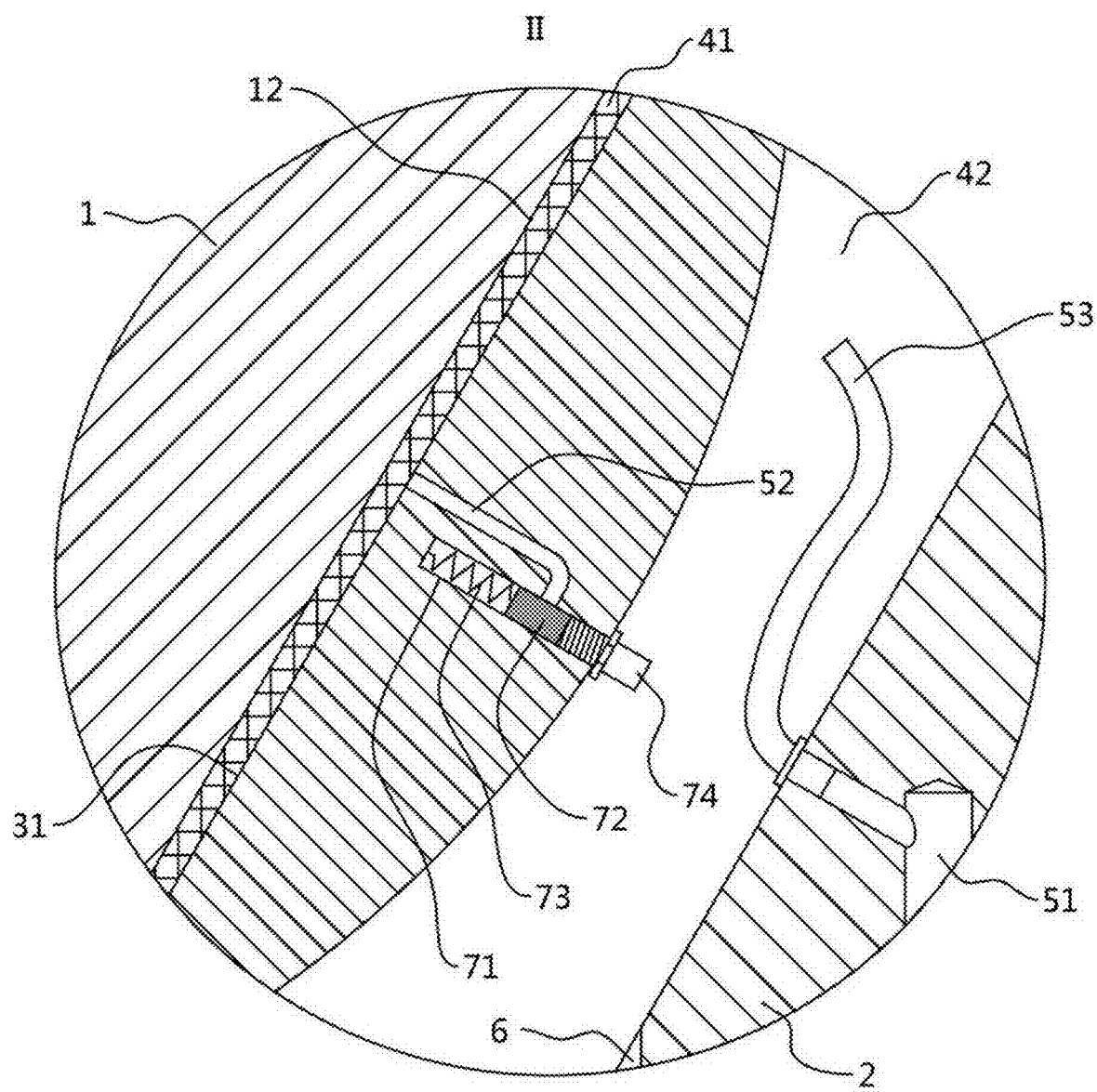
FIG. 5 shows an enlarged view at II in FIG. 2, in which a communicating component is not yet in communication with the tile block, and the slider is at an initial position.
Figure 6:
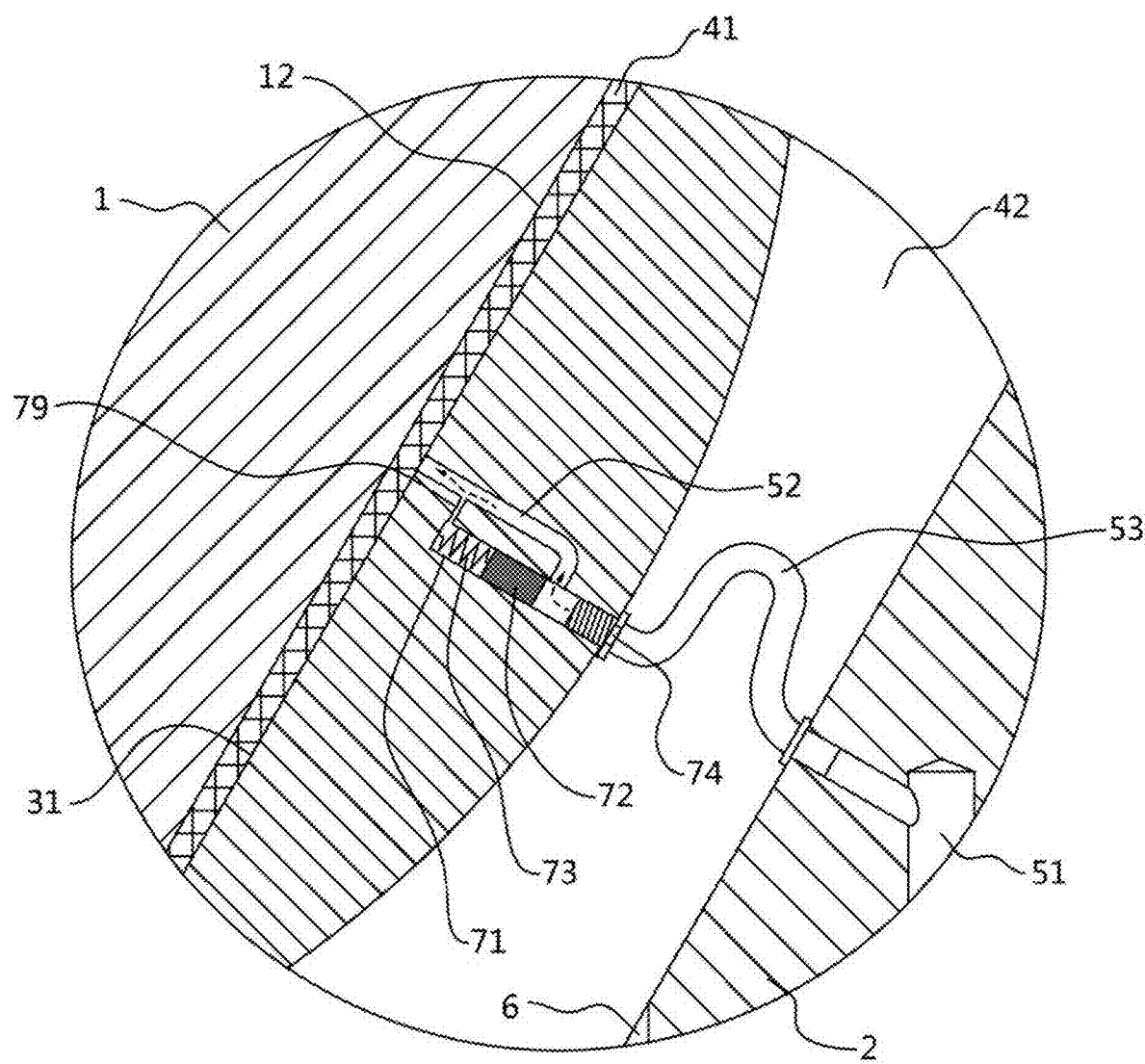
FIG. 6 shows an enlarged view at II in FIG. 2, in which the dashed arrows represent the flow direction of the lubricant.

In one implementation, the tile block 3 also has a unidirectional structure to prevent the backflow of the lubricant and ensure that there is the sufficient lubricant in the first oil cavity 41 to form a hydrostatic oil film. To improve the reliability and service life of the unidirectional structure, the unidirectional structure includes a sliding channel 71, a slider 72, a spring 73, and a joint 74. The sliding channel 71 is machined in the tile block 3. One end of the sliding channel 71 passes through the spherical face 32 of the tile block 3, but the other end of the sliding channel does not pass through the tile block 3, forming a bottom of the sliding channel 71. Referring to FIGS. 5 and 6, one end of the second flow channel 52 passes through the working face 31 of the tile block 3, and the other end of the second flow channel is connected to the middle of the sliding channel 71. The slider 72 is slidable in the sliding channel 71. One end of the joint 74 is connected to the sliding channel 71, and the other end of the joint is connected to the communicating component 53. The spring 73 and the slider 72 are both in the sliding channel 71. The spring 73 is between the bottom of the sliding channel 71 and the slider 72. The slider 72 is between the spring 73 and the joint 74. Initially, the slider 72 is pressed against the joint 74 by an elastic force from the spring 73. As shown in FIG. 5, the slider 72 just covers the second flow channel 52. As shown in FIG. 6, during infusion or injection of the lubricant, the slider 72 moves in the sliding channel 71 under the lubricant pressure and compresses the spring 73, exposing the second flow channel 52. After the infusion or injection is completed, the pressure in the communicating component 53 decreases. The spring 73 drives the slider 72 to automatically return to the initial position and automatically covers and disconnects the second flow channel 52, which not only can prevent the lubricant in the first oil cavity 41 from back-flowing, but also can provide a more stable and reliable support and counter-force for the lubricant in the first oil cavity 41, and ensure that the hydrostatic oil film in the first oil cavity 41 is more stable.

Figure 18:
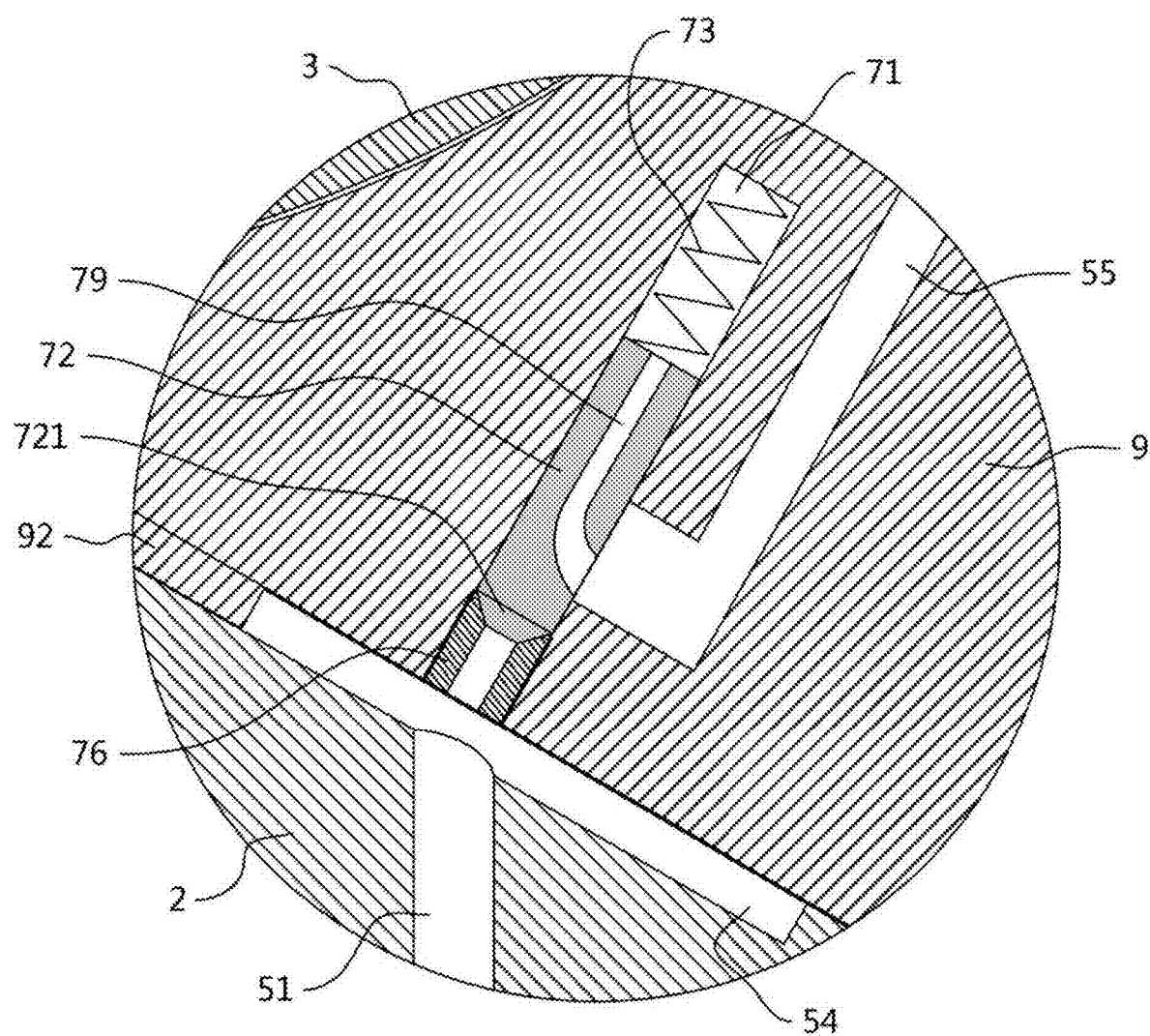
FIG. 18 shows a schematic diagram of a local structure at a slider at an initial position.
Figure 19:
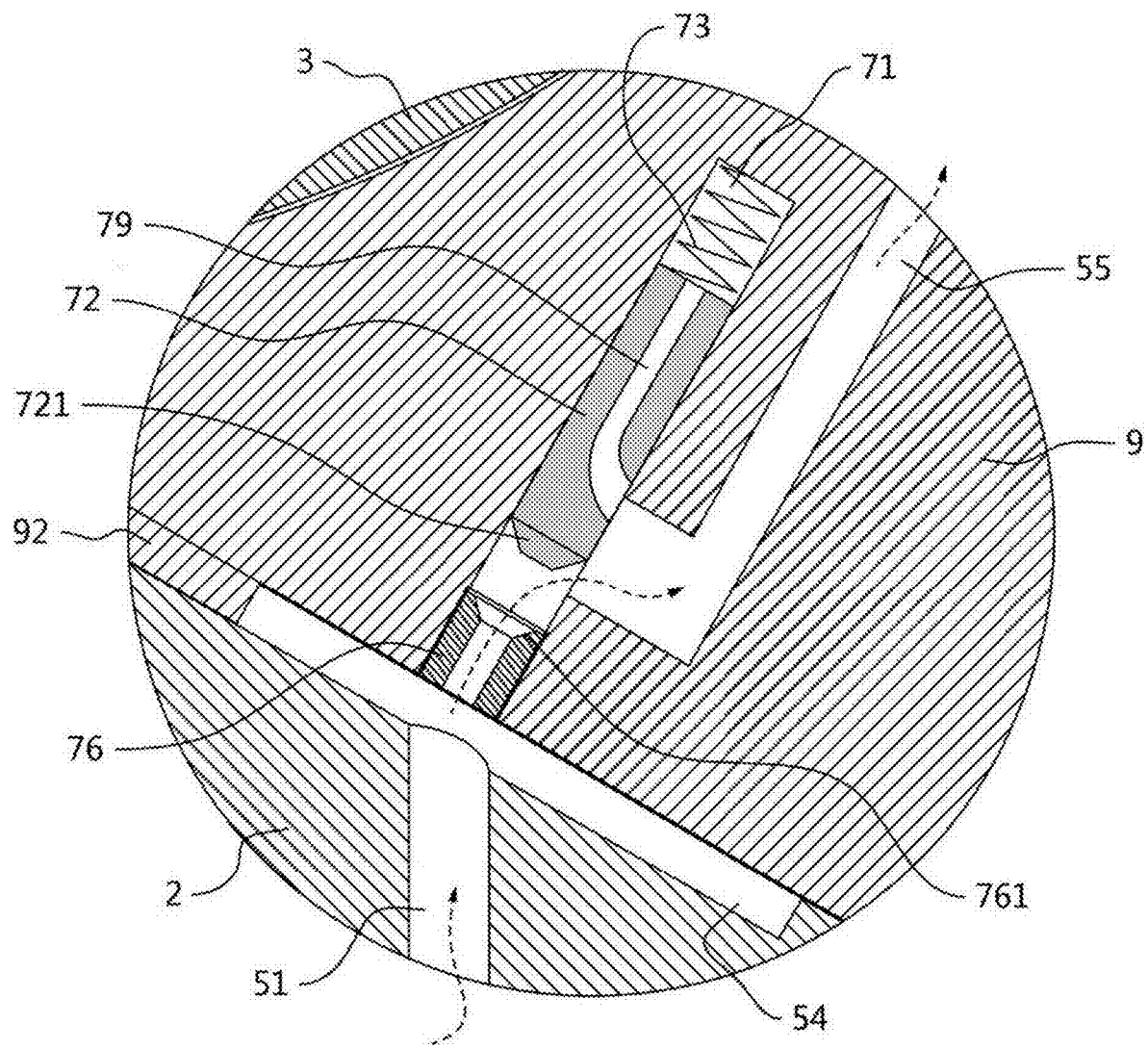
FIG. 19 shows a schematic diagram of a local structure of a slider, in which the dashed arrows represent the flow direction of the lubricant.

The joint 74 can be threadedly connected to the tile block 3. The tile block 3 can be or comprise a one-piece molding member or a combination member, and preferably has a "partial ball" structure, as shown in FIG. 2. To avoid the problem of air closure, in one solution, the tile block 3 is further constructed with a balancing passage 79 in communication with the bottom of the sliding channel 71 and the second flow channel 52 (FIG. 6). In another solution, the balancing passage 79 is constructed in the slider 72 (e.g., FIGS. 18-19). One end of the balancing passage 79 passes through the side wall of the slider 72, and the other end of the balancing passage passes through the end of the slider 72 toward the spring 73. Referring to FIGS. 6, 18 and 19, when the slider 72 rests against the joint 74 by the force of the spring 73, the balancing passage 79 is in communication with the second flow channel 52. When the slider 72 moves toward the bottom of the sliding channel 71 from the pressure of the lubricant so that the second flow channel 52 is in communication with the communicating component 53, the balancing passage 79 may remain in communication with the second flow channel 52. The end of the slider 72 toward the bottom of the sliding channel 71 has a pressure-bearing area smaller than that of the other end of the slider 72 (FIGS. 18-19). This design not only solves the problem of the air closure, but also realizes the function of self-locking, which is more stable and reliable.

Figure 7:
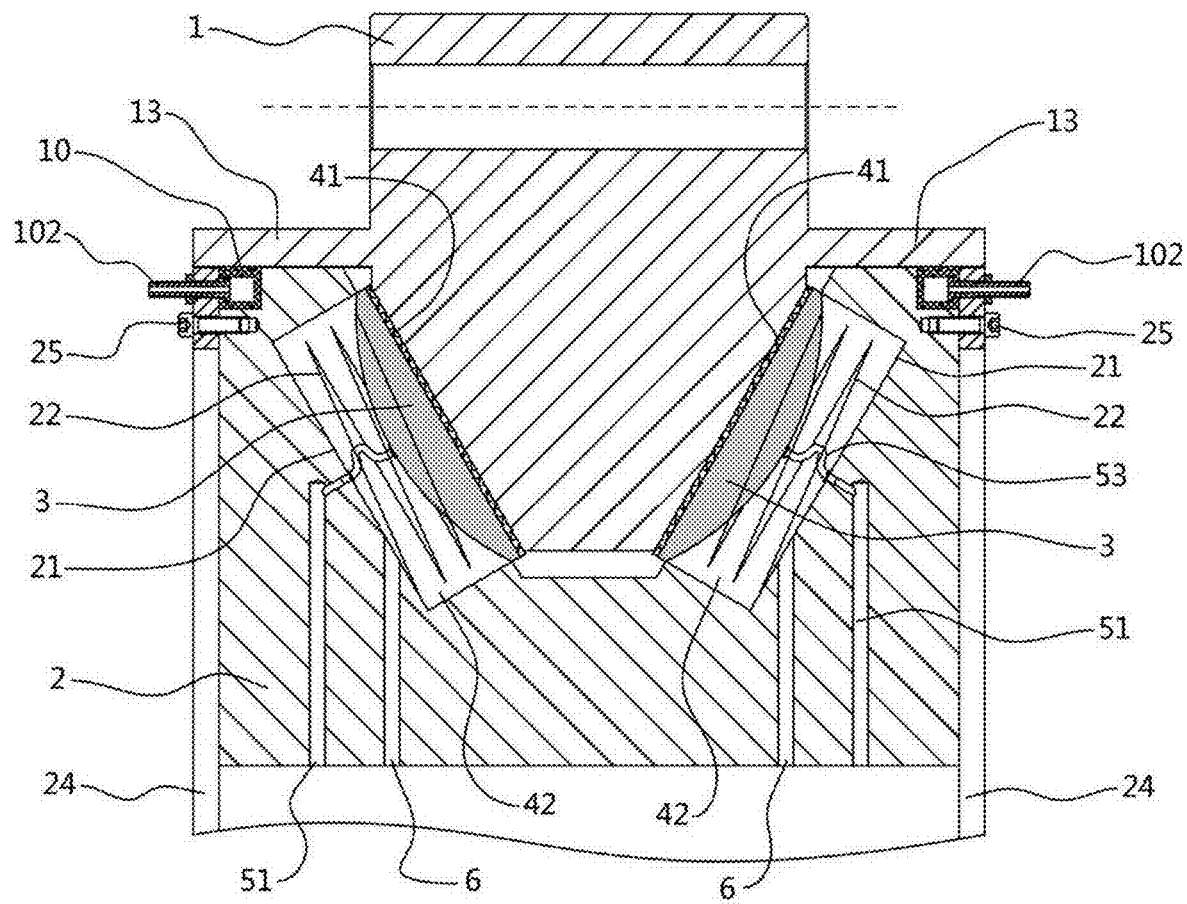
FIG. 7 shows a schematic diagram of a partial cross-section of yet another sliding bearing provided in Example 1 of the present invention.

In an implementation, an elastic member 22 is also in each of the chutes 21. One end of the elastic member 22 rests against the bottom of the chute 21, and the other end of the elastic member rests against the spherical face 32 of the tile block 3. The elastic member 22 may comprise a compression spring as shown in FIG. 7. The elastic member 22 is configured to support the tile block 3, which not only can provide a support force for the tile block 3 during assembly so that the tile block 3 can automatically fit with the corresponding sliding face 12, but also does not affect the action of the tile block 3 to follow the sliding face 12, thereby realizing the self-adaptive and automatic correction functions of the tile block 3. In implementation, the elastic member 22 can also adopt a spring shock absorber to reduce the vibration of the tile block 3, thereby allowing the sliding bearing to be more stable.

In an implementation, the inner ring 2 may include a backflow passage in communication with the second oil cavity 42. In one scenario, the backflow passage is only configured to discharge air or a high-pressure oil in the second oil cavity 42. After discharging the air or the high-pressure oil, the backflow passage can be blocked with a blocking head. In another scenario, the backflow passage can be in communication with the external high-pressure oil pump system to form a circulating high-pressure oil circuit.

Example 2

Figure 8:
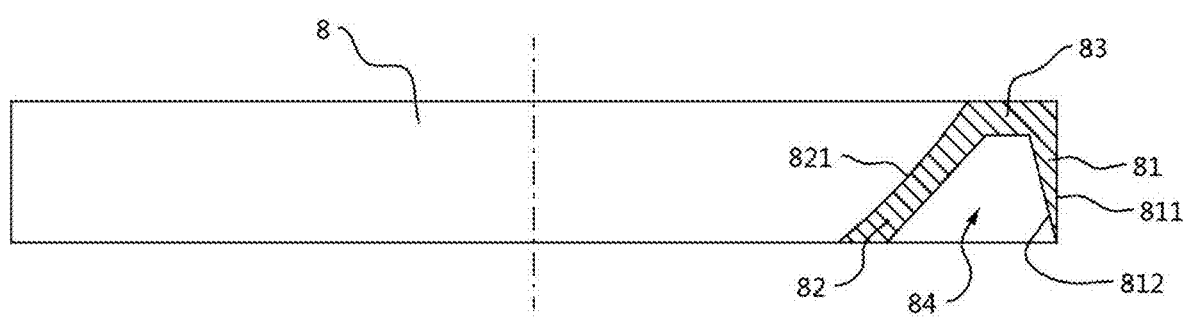
FIG. 8 shows a front view of a follower member provided in Example 2 of the present invention.
Figure 9:
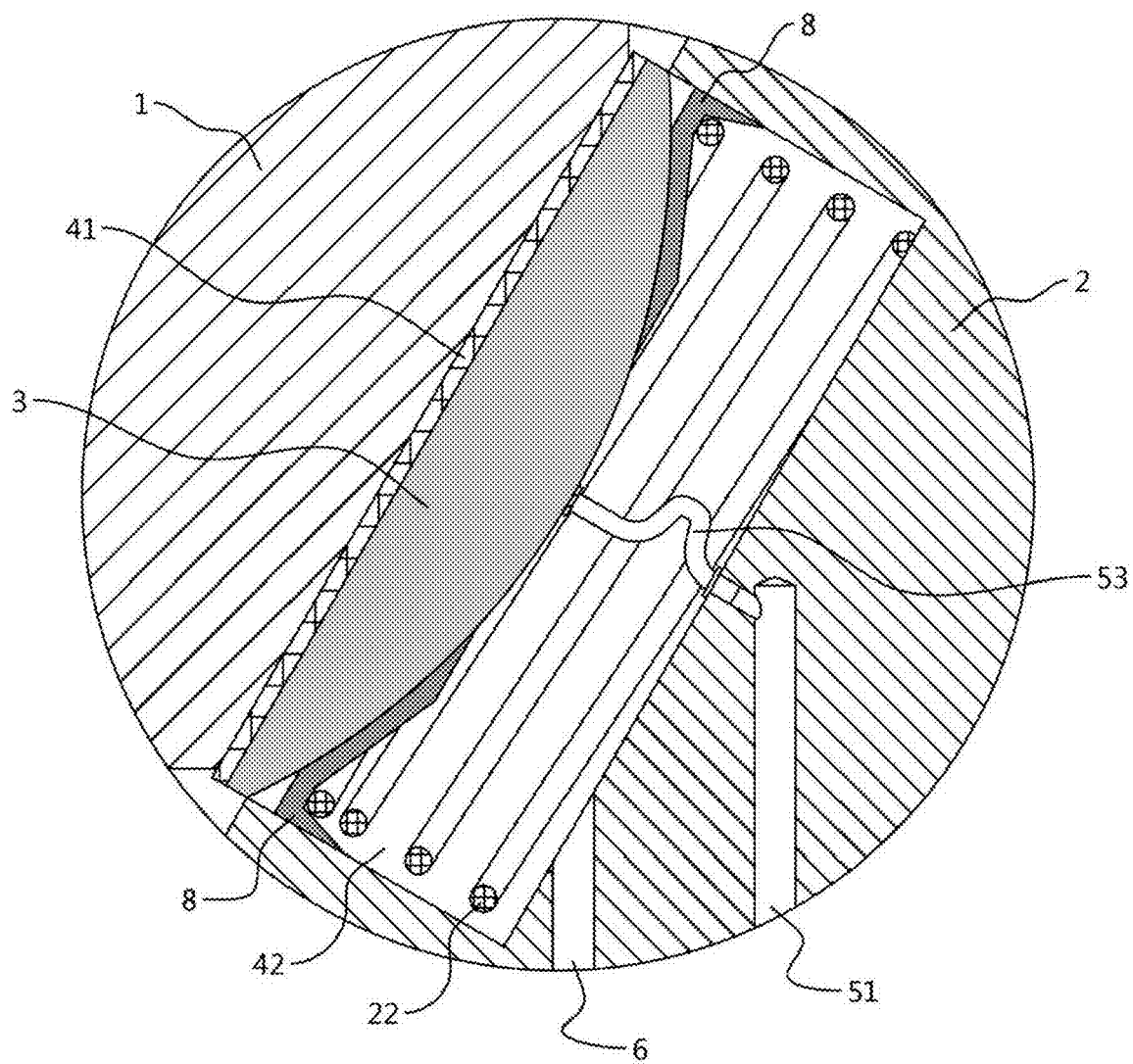
FIG. 9 shows a schematic diagram of a local structure at a chute after a sliding bearing shown in FIG. 7 is provided with a follower member shown in FIG. 8.

According to the sliding bearing in Example 1, a lubricant is infused or injected into the first oil cavity 41 to form an oil film between the outer ring 1 of the bearing and the tile block 3. There may be strict requirements on the parameters and the quality of the lubricant. The second oil cavity 42 is infused with a high-pressure oil, which is mainly configured to support and adjust the tile block 3. The lubricant and the high-pressure oil may have different parameters and qualities. However, according to the above structural design of the sliding bearing, because the tile block 3 can rotate or move relative to the chute 21, and there may be a pressure difference between the first oil cavity 41 and the second oil cavity 42, the high-pressure oil in the second oil cavity 42 can leak into the first oil cavity 41, resulting in the contamination of the lubricant in the first oil cavity 41, greatly reducing the lubricating effect of the lubricant in the first oil cavity 41, which very unfavorable to the formation of a hydrostatic pressure, leading to increased wear and affecting the service life of the sliding bearing. To this end, the sliding bearing may further include a follower member 8 (FIGS. 8-9) . . . . The follower member 8 includes a first circular body 81 adapted to the chute 21, a second circular body 82 adapted to the spherical face 32 of the tile block 3, and a support circle 83. The first circular body 81 and the second circular body 82 are connected to the outer and inner circumferences of the support circle 83, respectively. As shown in FIGS. 8 and 9, the first circular body 81, the second circular body 82, and the support circle 83 jointly enclose an annular receiving cavity 84. The receiving cavity 84 can at least receive the upper end of the elastic member 22. Therefore, the elastic member 22 can be utilized to provide at least part of a following support force for the follower member 8, so that the follower member 8 can always fit with the spherical face 32 of the tile block 3. As shown in FIG. 8, the first circular body 81 includes a first sealing face 811 for fitting with the inner surface of the chute 21. The inner side or surface of the first circular body 81 away from the first sealing face 811 may be beveled or curved (e.g., concave), which is conducive to better fitting with the inner surface of the chute 21 by the first circular body 81 under the pressure of the oil in cavity 42. As shown in FIGS. 8 and 9, the second circular body 82 includes a second sealing face 821. The second sealing face 821 is also spherical, for fitting with the spherical surface 32 of the tile block 3, which can better fit with the tile block 3. Further, the tile block 3 can rotate relative to the second sealing face 821.

As shown in FIG. 9, the lower end of the elastic member 22 rests against the bottom of the chute 21. The follower member 8 is in the chute 21. The upper end of the elastic member 22 is in the receiving cavity 84 of the follower member 8 and rests against the support circle 83, or rests against the first circular body 81 and the second circular body 82 at the same time, which not only can effectively support the follower member 8, but also can squeeze the first circular body 81 and the second circular body 82 to achieve a better sealing effect. As shown in FIG. 9, the first circular body 81 fits with the inner surface of the chute 21. The second circular body 82 fits with the spherical face 32 of the tile block 3. The elastic member 22 has a sufficient elastic force, so that initially, the elastic member 22 can support the tile block 3 through the follower member 8 and provide a preloading force for the follower member 8 to press against the tile block 3. When in use, the support spring 22 and a high pressure inside the second oil cavity 42 jointly support the follower member 8. Even if the follower member 8 wears out, automatic compensation can also be made for the wear, so that the follower member always fits with the tile block 3 and the chute 21. Therefore, the high-pressure oil in the second oil cavity 42 is effectively prevented from leaking into the first oil cavity 41 and mixing with the lubricant therein, so as to ensure the quality of the lubricant in the first oil cavity 41.

Figure 11:
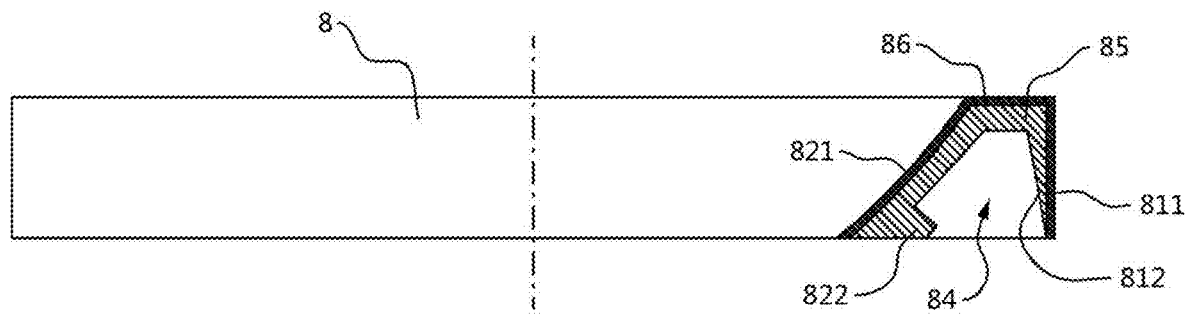
FIG. 11 shows a sectional view of another follower member provided in Example 2 of the present invention.

In one implementation, the follower member 8 may be an integral non-metallic material such as a rubber, a polyurethane, or polytetrafluoroethylene (PTFE), or an integral metallic material, or a combination of the metallic material and the non-metallic material, e.g., the first circular body 81, the second circular body 82, and the support circle 83 may all comprise a base body 85 comprising the metallic material and an elastic layer 86 on the outside of the base body 85 (FIG. 11). The base body 85 encloses a receiving cavity 84, as shown in FIGS. 8 and 11. The elastic layer 86 may comprise a rubber, a polyurethane, PTFE, or the like, which can not only improve the reliability and service life of the follower member 8, but also utilize the elastic layer 86 to achieve a satisfactory sealing effect. The elastic layer can be replaced and/or maintained during use, significantly improving the reliability of the follower member 8.

Figure 10:
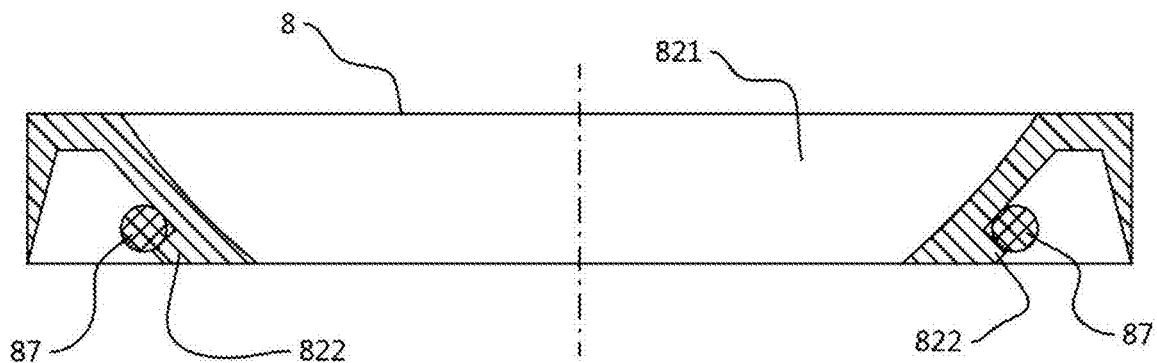
FIG. 10 shows a sectional view of another follower member provided in Example 2 of the present invention.

As shown in FIG. 10, in a further solution, the inside of the lower end of the second circular body 82 is also constructed with a ring-shaped protrusion 822, to form an annular slot inside the second circular body 82. A circular or ring-shaped spring 87 can be placed in the annular slot. The circular spring 87 can be utilized to further tighten the lower end of the second circular body 82, thereby increasing a fitting pressure between the second circular body 82 and the tile block 3, and favorably achieving the desired sealing effect.

Example 3

Figure 12:
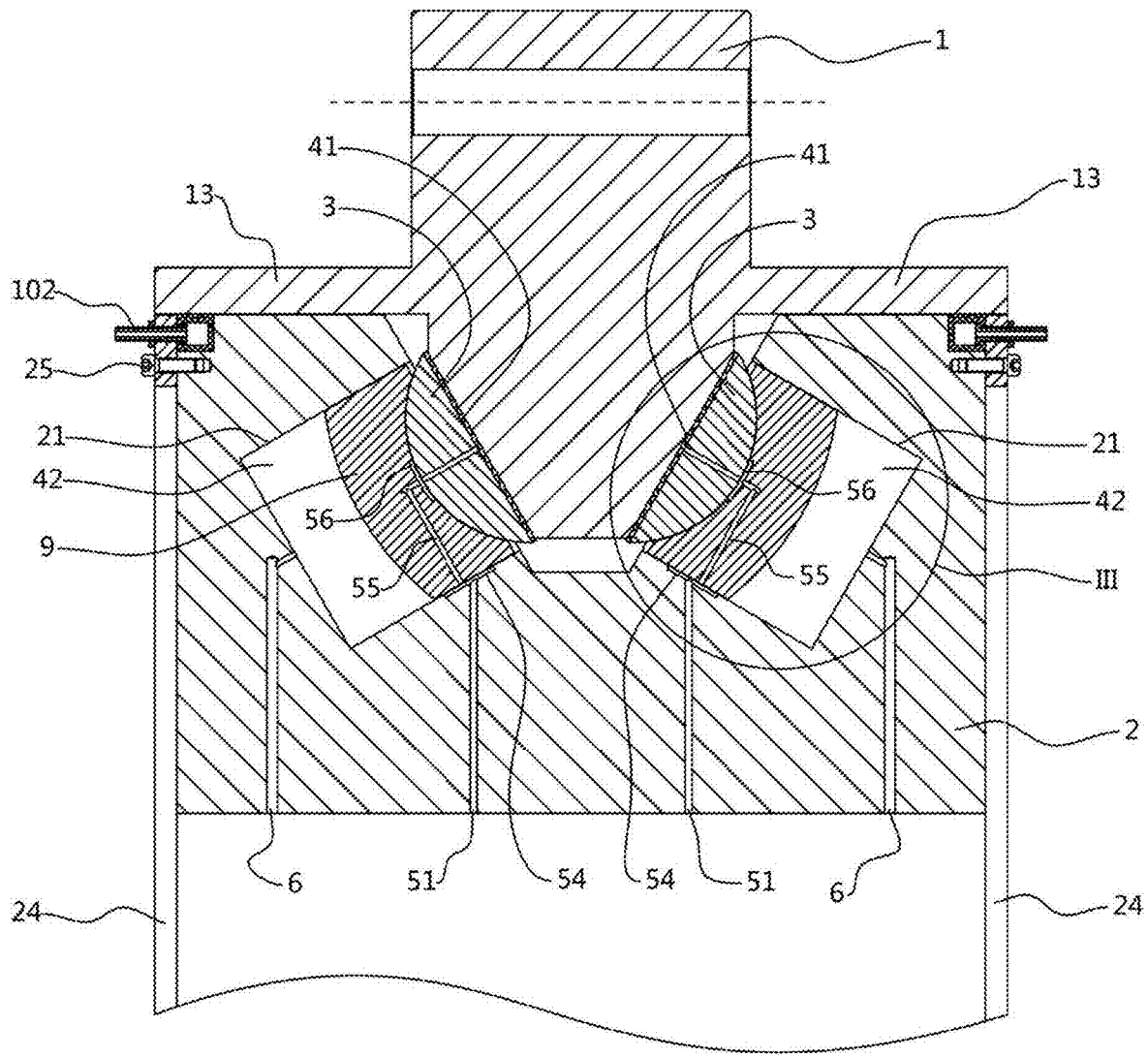
FIG. 12 shows a schematic diagram of a partial cross-section of a sliding bearing provided in Example 3 of the present invention.
Figure 14:
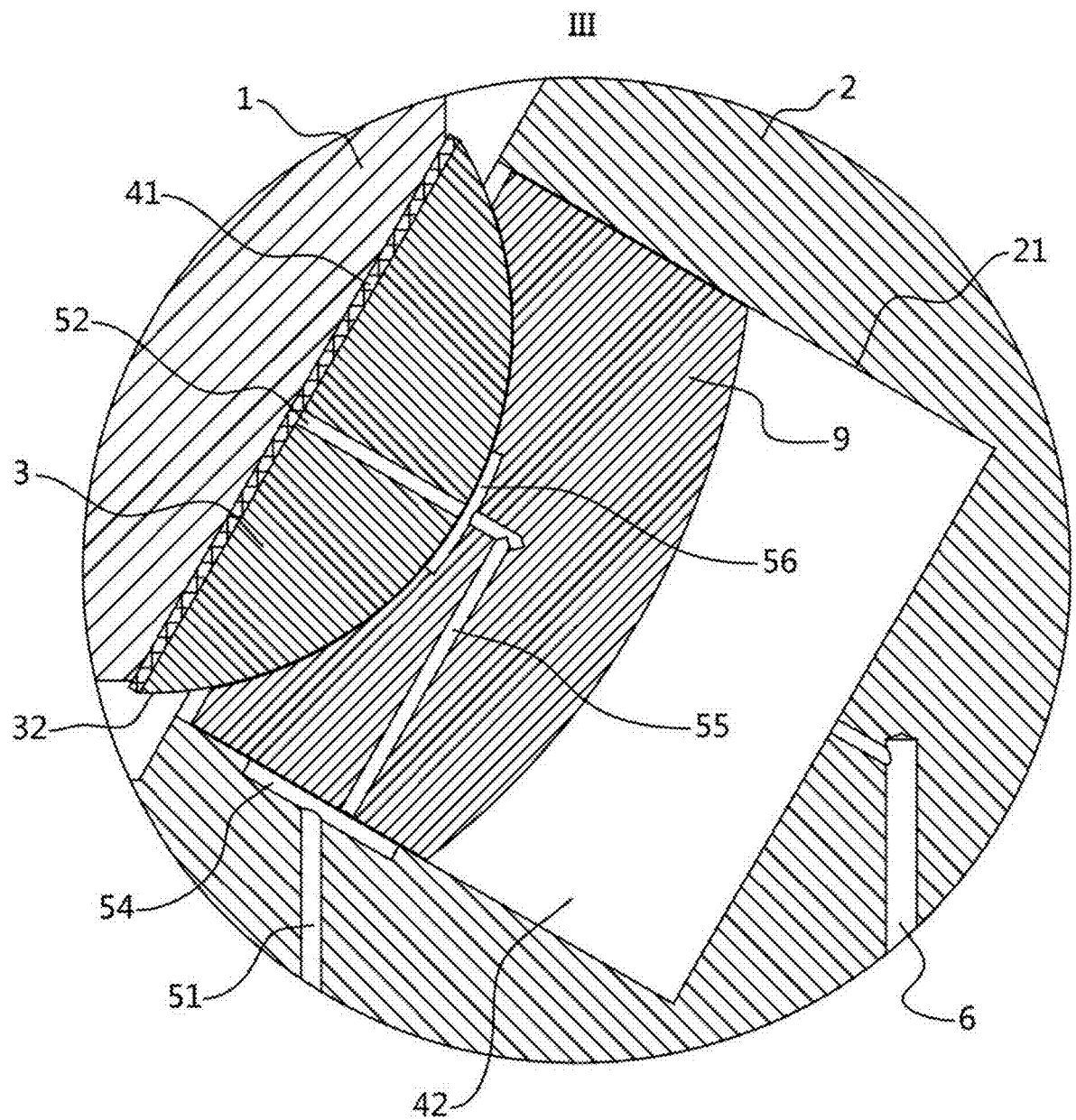
FIG. 14 shows an enlarged view at III in FIG. 12.

In the embodiment(s) provided in Example 1, a communicating component 53 may be configured in the second oil cavity 42 to provide a lubricant for the first oil cavity 41. The communicating component 53 is flexible. Because the communicating component 53 is in a high-pressure environment, it may be challenging to ensure the reliability and stability of the communicating component 53. Therefore, the sliding bearing in this example further includes a guide seat 9. As shown in FIG. 12 and FIG. 14, the guide seat 9 is in the chute 21. At least the lower end of the guide seat 9 can be inserted into the chute 21. The second oil cavity 42 is between the guide seat 9 and the chute 21. As shown in FIG. 12, the tile block 3 and the chute 21 may form a moving pair along the depth of the chute 21. The guide seat 9 can be moved in a straight line in the chute 21 by the pressure of the oil in the second oil cavity 42, to regulate or adjust the spacing between the tile block 3 (and/or the guide seat 9) and the outer ring 1.

Figure 13:
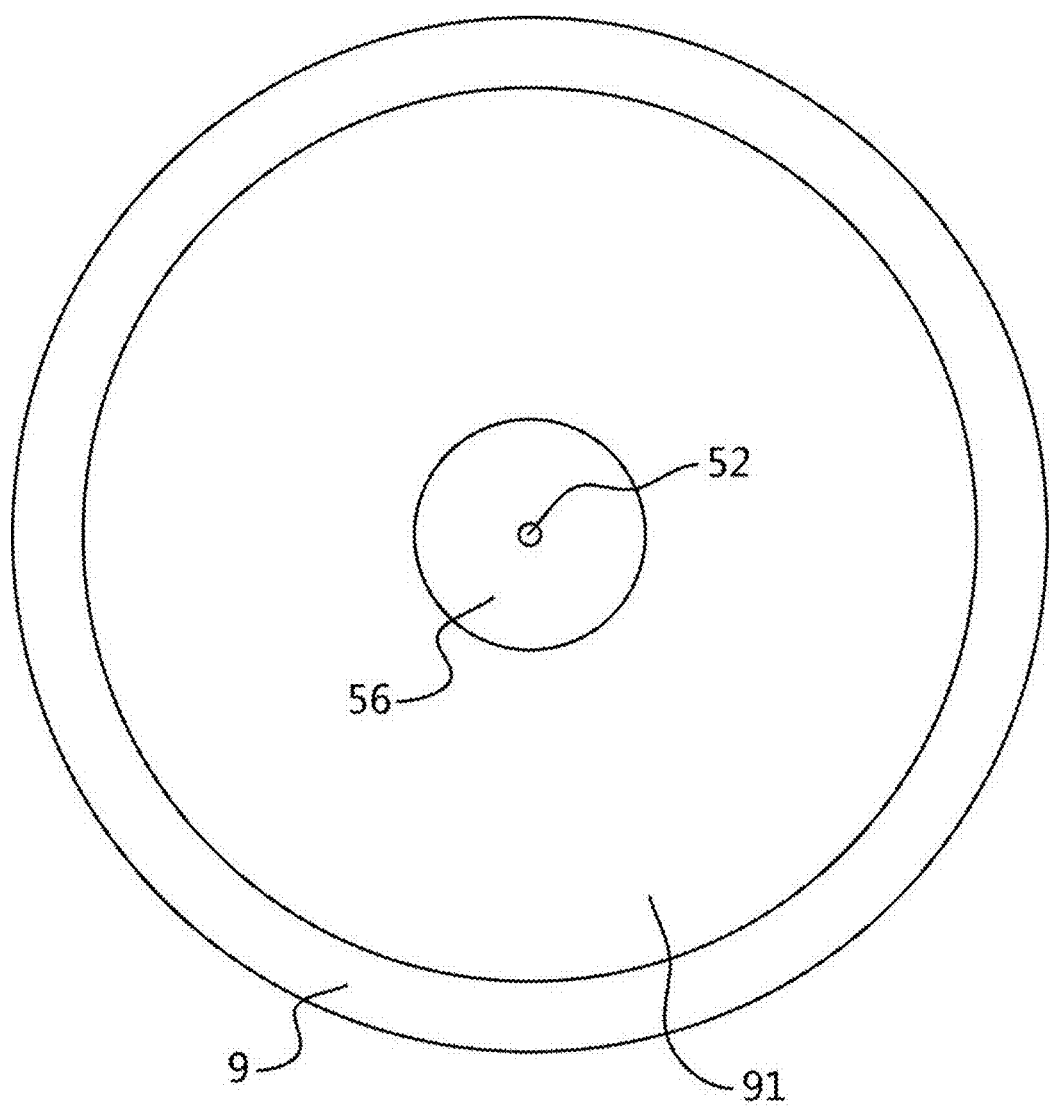
FIG. 13 shows a top view of a guide seat provided in Example 3 of the present invention.

As shown in FIGS. 12 and 13, the top of the guide seat 9 has an inner concave face 91 adapted to the spherical face 32 of the tile block 3. The inner concave face 91 is curved or spherical, and may mate with or complement the spherical face 32. The tile block 3 is mounted on the inner concave face 91 of the guide seat 9. The spherical face 32 of the tile block 3 and the inner concave face 91 of the guide seat 9 form a spherical face pair so that the tile block 3 can tilt or rotate relative to the guide seat 9, thereby automatically fitting with and adapting to a corresponding sliding face 12. In use, a spacing between the tile block 3 and the corresponding sliding face 12 is adjusted by the pressure of the oil in the second oil cavity 42, which compensates for the amount of wear of the tile block 3, avoids problems such as increased wear and vibration caused by variations in the gap between the tile block 3 and the corresponding sliding face 12, eliminates the need to replace the tile block 3, and further ensures the precision of the contact between the tile block 3 and the corresponding sliding surface 12 to ensure formation of a hydrostatic pressure. In addition, the high-pressure oil in the second oil cavity 42 can be utilized to level and correct the outer ring 1 should it tilt, ensuring air gaps between the wind-driven generator stator and the wind-driven generator rotor are uniform.

As shown in FIGS. 2, 12 and 14, a first oil supply passage 5 includes a first flow channel 51 in the inner ring 2, a vertical flow channel 54 in the wall of the chute 21, a transverse flow channel 55 in the guide seat 9, a circular groove in the inner concave face 91, and a second flow channel 52 in the tile block 3. The vertical flow channel 54 is oriented along a depth direction of the chute 21. The first flow channel 51 is in communication with the vertical flow channel 54. One end of the transverse flow channel 55 passes through the side wall of the ˆand forms an inlet in the side wall of the guide seat 9. The inlet corresponds to the vertical flow channel 54, and is in communication with the vertical flow channel 54. The circular groove 56 is at the center of the inner concave face 91. The other end of the transverse flow channel 55 is in communication with the circular groove 56. As shown in FIG. 14, the second flow channel 52 is at the center of the tile block 3. The two ends of the second flow channel 52 pass through a working face 31 and the spherical face 32 of the tile block, respectively. Initially, as shown in FIG. 12, the second flow channel 52 is in communication with the circular groove 56. The lubricant enters the first oil cavity 41 via the first flow channel 51, the vertical flow channel 54, the transverse flow channel 55, the circular groove 56, and the second flow channel 52, thereby avoiding any need for communicating component 53 in the second oil cavity 42, and leading to a lower failure rate, and greater reliability and stability.

Figure 15:
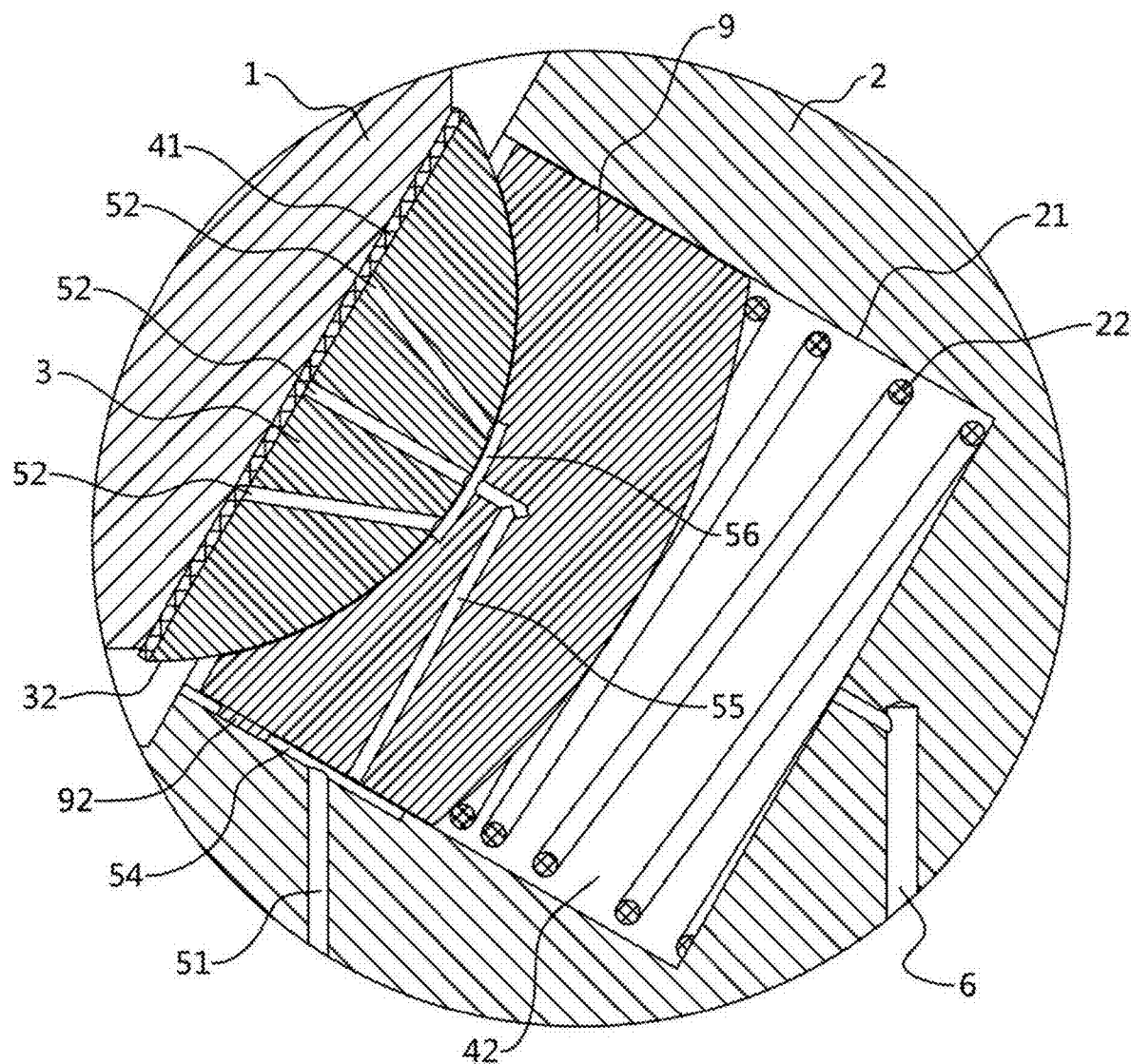
FIG. 15 shows a schematic diagram of a local structure at a chute in another sliding bearing provided in Example 3 of the present invention.

The circular groove 56 has a suitably large area so that the second flow channel 52 on the tile block 3 can always remain in communication with the circular groove 56. However, the tile block 3 can comprise at least four second flow channels 52. One of the second flow channels 52 is at the central position of the tile block 3. As shown in FIG. 15, the other three second flow channels 52 are uniformly distributed circumferentially around the central second flow channel. In one implementation, spacings between the second flow channels 52 gradually increase along a direction from the guide seat 9 to the first oil cavity 41.

In this solution, the spherical face 32 of the tile block 3 and the inner concave face 91 of the guide seat 9 can always fit. An elastic member 22 may also be in the chute 21. One end of the elastic member 22 rests against the bottom of the chute 21, and the other end of the elastic member rests against the guide seat 9. As shown in FIG. 15, the elastic member 22 is configured to support the guide seat 9 and the tile block 3.

Figure 16:
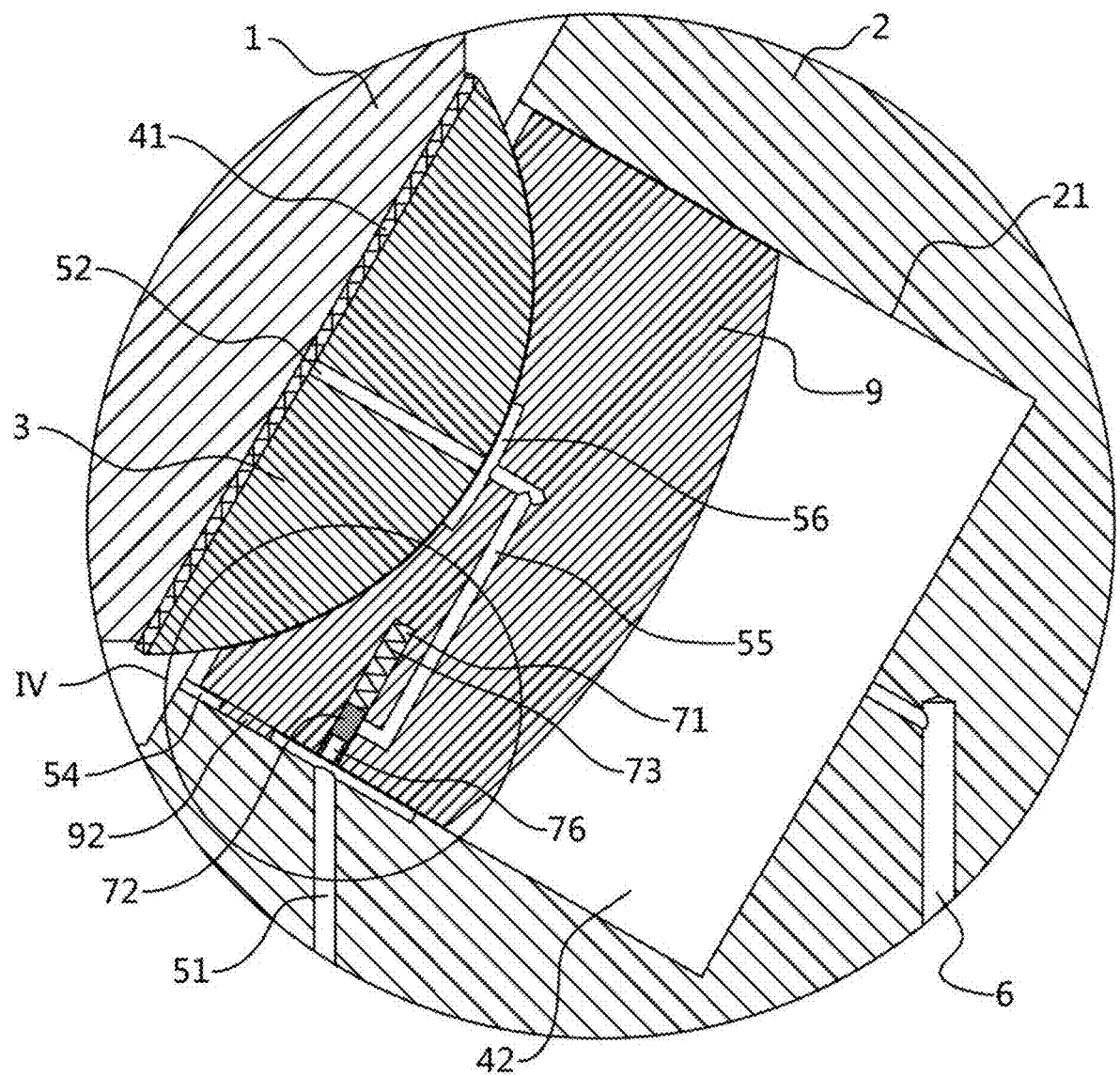
FIG. 16 shows a schematic diagram of a local structure in a chute in another sliding bearing provided in Example 3 of the present invention.

In one implementation, the vertical flow channel 54 has a length that at least meets the movement demand of the guide seat 9, so that the transverse flow channel 55 can always be kept in communication with the vertical flow channel 54 within a movement range of the guide seat 9. Further, the upper end of the vertical flow channel 54 may pass through an outer surface of the inner ring 2. Referring to FIG. 15 and FIG. 16, the guide seat 9 may have a limiting protrusion 92 on a side therefor, adapted to the vertical flow channel 54. The limiting protrusion 92 is constrained so that is moves only in the vertical flow channel 54. The vertical flow channel 54 cooperates with the limiting protrusion 92, so that a position of the guide seat 9 can be limited and constrained (e.g., within the chute 21). Therefore, the guide seat 9 can be prevented from rotating relative to the chute 21, ensuring that the vertical flow channel 54 is always in communication with the transverse flow channel 55. The limiting protrusion 92 can effectively block the upper end of the vertical flow channel 54, which can prevent the lubricant from leaking out through the upper end of the vertical flow channel 54 as much as possible, and ensures that most if not all of the lubricant enters the first oil cavity 41.

Figure 17:
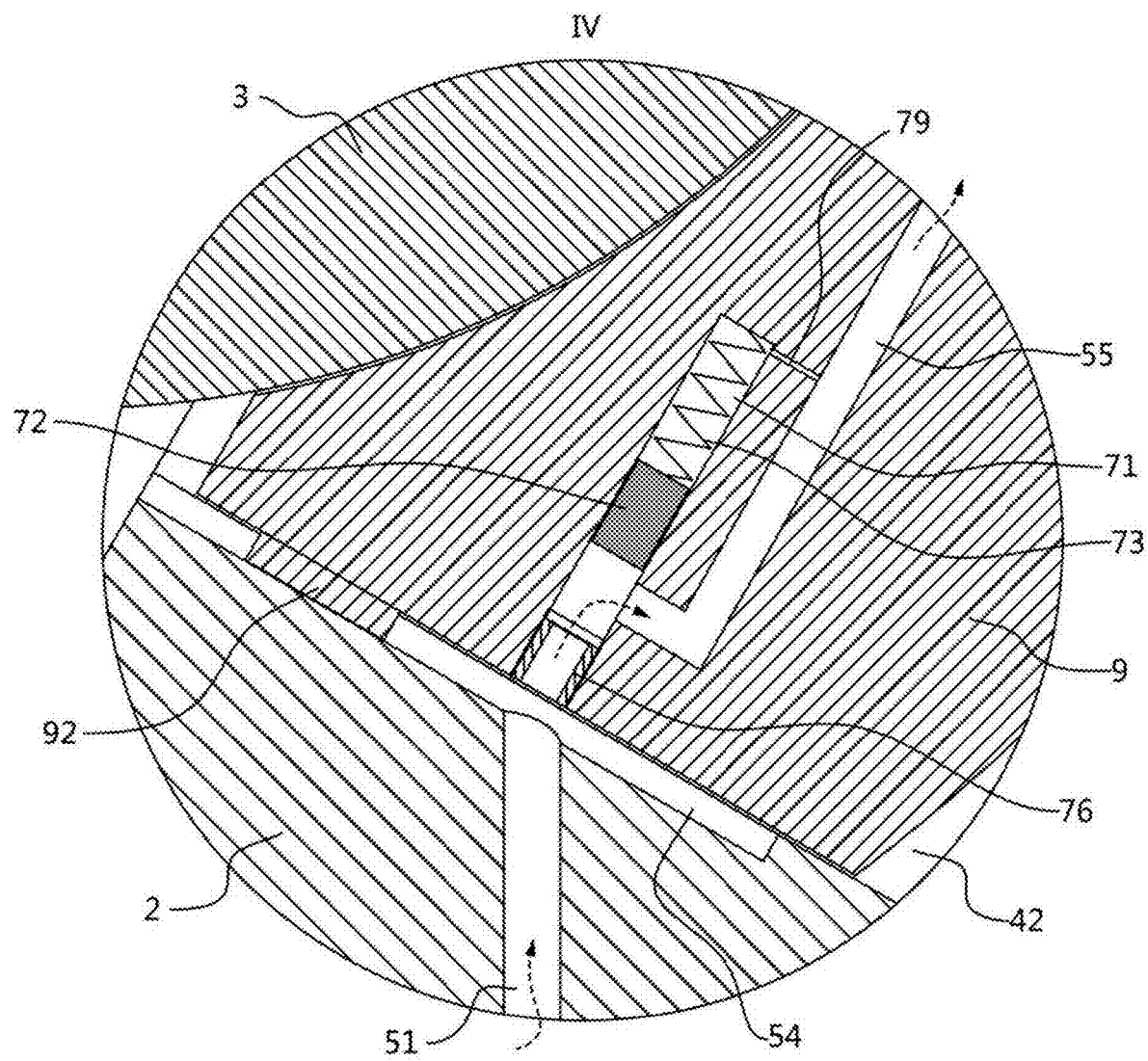
FIG. 17 shows an enlarged view at IV in FIG. 16, in which the dashed arrows represent the flow direction of the lubricant.

In actual operation, a large static pressure is in the first oil cavity 41. The lubricant in the first oil cavity 41 is likely to flow back under the static pressure through the first oil supply passage 5, which can result in a decrease or failure in the static pressure. In one implementation, although a check valve can be configured in the lubricant pump system in communication with the first oil supply passage 5 to prevent the lubricant from flowing back, the check valve can be placed in a conduit only outside the sliding bearing. Under the large pressure in the first oil cavity 41, the lubricant in the first oil cavity 41 can be easily lost through gaps between the guide seat 9 and the chute 21 and between the vertical flow channel 54 and the limiting protrusion 92, which greatly reduces the duration and stability of the oil film in the first oil cavity 41. Therefore, a unidirectional structure is also configured at the transverse flow channel 55 of the guide seat 9, which prevents the backflow of the lubricant, thereby improving the durability and stability of the oil film in the first oil cavity 41. As shown in FIG. 16, the transverse flow passage 55 includes a sliding channel 71 and a communicating passage (not numbered). The unidirectional structure includes a slider 72 and a spring 73. The sliding channel 71 may be machined in the guide seat 9. One end of the sliding channel 71 opens through the side wall of the guide seat 9 to form an inlet, and the other end of the sliding channel 71 does not pass through the guide seat 9 to form the bottom of the sliding channel 71, as shown in FIG. 16. One end of the communicating passage (or the transverse flow passage 55) may be in communication with the circular groove 56, and another end of the communicating passage (or the transverse flow passage 55) is connected to the sliding channel 71 (e.g., towards the inlet end of the sliding channel 71). The slider 72 is constructed for and/or adapted to the sliding channel 71. The slider 72 is slidable in the sliding channel 71. When assembled, the spring 73 and the slider 72 are both in the sliding channel 71. The spring 73 is between the bottom of the sliding channel 71 and the slider 72. The slider 72 is between the spring 73 and the inlet, and corresponds to the communicating passage (or the transverse flow passage 55), as shown in FIG. 16. Initially, the slider 72 blocks the communicating passage (or the transverse flow passage 55). During infusion of the lubricant, the slider 72 moves deeper into the sliding channel 71 under the pressure of the lubricant and compresses the spring 73, exposing the communicating passage and/or the transverse flow passage 55, as shown in FIG. 17. Therefore, the lubricant enters the first oil cavity 41 smoothly. After the infusion is completed, the slider 72 automatically returns to the initial position from the elastic pressure of the spring 73 and automatically blocks the communicating passage and/or the transverse flow passage 55. The lubricant in the communicating passage and/or the transverse flow passage 55 cannot move (or move past) the slider 72, and the unidirectional structure including the slider 72 prevents the lubricant from leaking through the sliding channel 71 and flowing back into the first oil supply passage 5. In one implementation, the unidirectional structure further includes a limiting member 76. Referring to FIGS. 16 and 17, the limiting member 76 comprises a cartridge- or cylinder-shaped structure through which the lubricant flows. The limiting member 76 is threadedly connected into the sliding channel 71. Initially, the slider 72 presses against the limiting member 76 under the elastic force of the spring 73. The limiting member 76 limits and constrains the slider 72, and the spring 73 initially has an elastic force sufficient to press the slider 72 against the limiting member 76, thereby improving the effectiveness of backflow prevention. In one implementation, the guide seat 9 also includes a balancing passage 79 in communication with the bottom of the sliding channel 71 (FIG. 17). The balancing passage 79 can be in communication with the transverse flow channel 55, which is conducive to smoother movement of the slider 72.

To solve the problem of air closure, in one solution, the guide seat 9 is further constructed with the balancing passage 79 in communication with the bottom of the sliding channel 71. The balancing passage 79 is in communication with the transverse flow channel 55, referring to FIG. 17. In another solution, the balancing passage 79 is constructed in the slider 72 (FIG. 18). One end of the balancing passage 79 opens through the side wall of the slider 72, and the other end of the balancing passage 79 opens through the end of the slider 72 toward the spring 73. Referring to FIG. 18, when the slider 72 rests against the limiting member 76 by the force of the spring 73, the balancing passage 79 is in communication with the transverse flow channel 55. When the slider 72 moves toward the bottom of the sliding channel 71 from the pressure of the lubricant so that the vertical flow channel 54 is in communication with the transverse flow channel 55, the balancing passage may be in communication with the first flow channel 51 and/or the transverse flow channel 55. The end of the slider 72 toward the bottom of the sliding channel 71 has a pressure-bearing area smaller than that of the other end of the slider 72 (e.g., surface 721). This design not only solves the problem of the air closure, but also realizes the function of self-locking when the balancing passage 79 is not in communication with the transverse flow channel 55, which is more stable and reliable.

In one implementation, a conical hole 761 is at the end of the limiting member 76 facing the slider 72. A conical head 721 adapted to the conical hole is on the end of the slider 72 facing the limiting member 76. Initially, as shown in FIGS. 18 and 19, the conical head 721 of the slider 72 fits in the conical hole 761 in the limiting member 76 under the elastic force of the spring 73 and tightly presses against the conical hole 761, which can realize a better effect of anti-backflow through the cooperation of the conical hole 761 and the conical head 721. Further, through the cooperation of the conical hole 761, the conical head 721, and the spring 73, automatic compensation can be made after wear occurs, ensuring the reliability of the anti-backflow mechanism/structure. In one implementation, the slider 72 and the joint in Example 1 can also include such a design, which is not repeated here.

Figure 20:
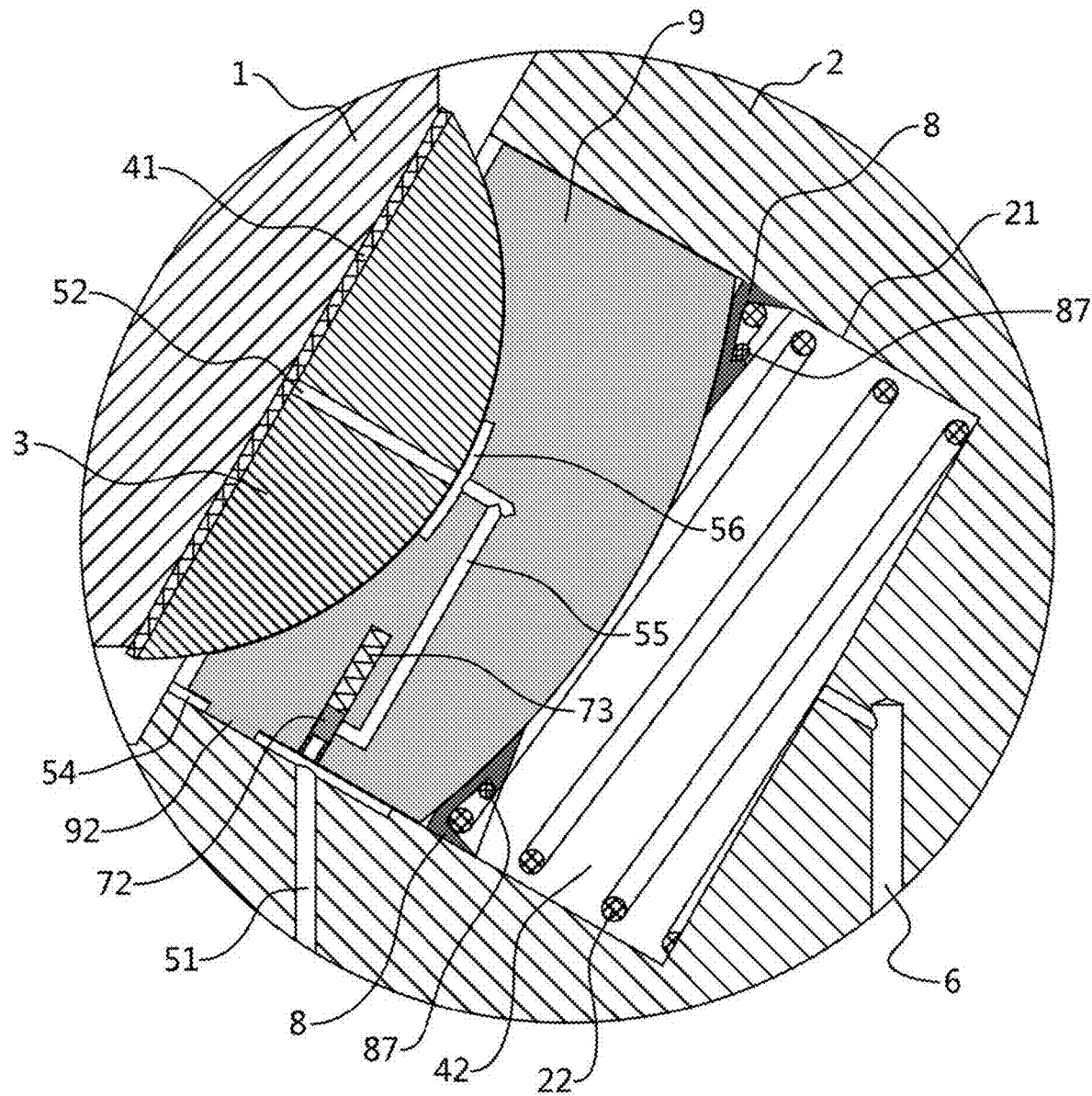
FIG. 20 shows a schematic diagram of a local structure in the chute in another sliding bearing provided in Example 3 of the present invention.

Similarly, the follower member 8 in the above Example 2 may also be at the bottom of the guide seat 9. The upper end of the elastic member 22 rests against the follower member 8, as shown in FIG. 20. The follower member 8 rests against both the guide seat 9 and the inside wall of the chute 21, thereby preventing the high-pressure oil from leaking out through a gap between the follower member 8 and the chute 21. In one implementation, the second circular body 82 in the follower member 8 complements, mates with or is adapted to the guide seat 9. For example, a second sealing face 821 (FIGS. 10 and/or 11) of the second circular body 82 fits with the surface of the guide seat 9. In another example, as shown in FIG. 20, the end of the guide seat 9 farthest into the chute 21 functions as the spherical face (e.g., 32, FIG. 3). The second sealing face 821 of the follower member 8 fits with the spherical/curved (convex) face at the end of the guide seat 9, which not only provides a better sealing effect but also enables a support force of the high-pressure oil in the second oil cavity 42 on the guide seat 9 to be distributed more evenly, achieving a more stable support effect.

As shown in FIG. 20, a circular or ring-shaped spring 87 is below and/or adjacent to the second circular body 82 so as to further tighten a lower end of the second circular body 82 and increase a fitting pressure between the second circular body 82 and the guide seat 9, which is conducive to improving the sealing effect. Further, pre-tightening can be automatic after wear occurs, to ensure the sealing effect. The shape and dimensions of the guide seat 9 are adapted the shape and dimensions of the chute 21, e.g., the chute 21 is a cylindrical chute, and at least the lower end of the guide seat 9 is a cylindrical structure.

Example 4

Figure 3:
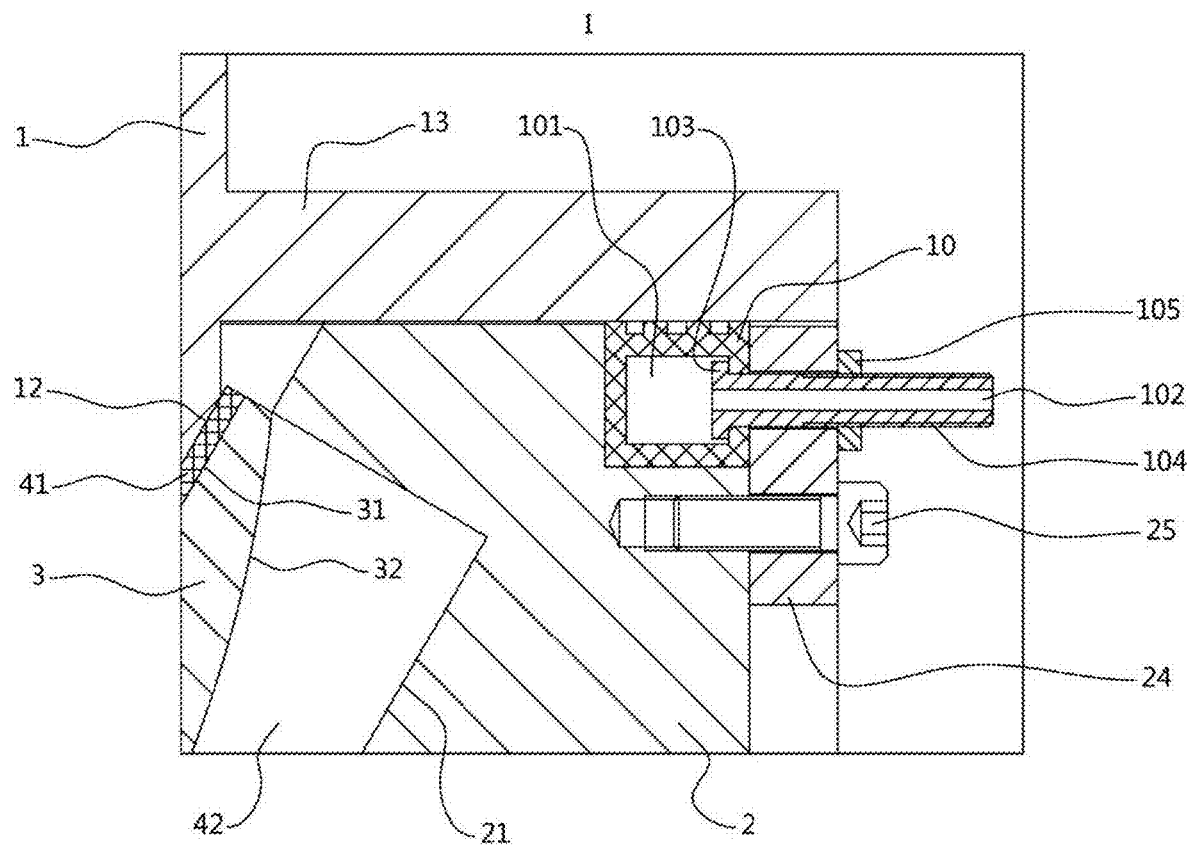
FIG. 3 shows an enlarged view at I in FIG. 2.

Because a wind-driven generator operates in air, the working environment can be harsh. Operation and maintenance costs can be high. Therefore, the reliability of the bearing should also be high, especially the sealing performance of the bearing. For a wind power main-shaft bearing, due to the prolonged operation at a high load, an ordinary sealing member may wear out and suffer from one or more gaps after use over a long period of time, which reduces the sealing effect. For the wind power main-shaft bearing, it is difficult to replace the sealing member, and hence it is not suitable for frequent replacement. However, if the sealing member is not replaced in a timely manner, the lubricant in the bearing may leak, causing a potential safety hazard. To solve these technical problems, the sliding bearing in this example also includes an annular shell plate 13, an elastic circular body 10, and an oil-replenishing pipe 102 (FIGS. 2 and 3). The annular shell plates 13 are fixed and/or connected to opposed end faces of the outer ring 1. The outer ring 1 and the annular shell plates 13 may be an integral structure. One or more annular grooves 23 are in the edge (e.g., the circumference) and/or end face(s) (e.g., adjacent to the circumference) of the inner ring 2. An elastic circular/toroidal body 10 is in each annular groove 23. The elastic circular body 10 is a hollow structure. An oil inlet is in the side of the elastic circular body 10. An oil-replenishing pipe 102 is fixed and/or connected to the oil inlet of the elastic circular body 10. The oil-replenishing pipe 102 is in communication with a hollow cavity 101 of the elastic circular body 10. A pressurized oil can be injected into the cavity 101 of the elastic circular body 10 through the oil-replenishing pipe 102. In implementation, the elastic circular body 10 comprises rubber. The elastic circular body 10 can expand from the pressure of the oil in the cavity 101 and tightly fit against the annular shell plate 13 to realize efficient sealing between the inner ring 2 and the annular shell plate 13 of the bearing. When the elastic circular body 10 wears out or loses oil during normal use, the oil can be replenished in the cavity 101 of the elastic circular body 10 through the oil-replenishing pipe 102 to increase the pressure and expand the elastic circular body 10 to tightly fit with the annular shell plate 13 of the bearing and realize efficient sealing again. In this design, the pressure in the cavity 101 is controlled, which can effectively compensate for the normal wear of the elastic circular body 10, ensure sealing reliability of the bearing, minimize the number of replacements of the sealing member and effectively save operation and maintenance costs.

Referring to FIGS. 1-3, in one implementation, a retaining ring 24 is fixed and/or connected to the end face(s) of the inner ring 2. The retaining ring 24 can be specifically fixed and/or connected to the inner ring 2 by a hexagonal socket cylindrical head screw 25. A through hole is in the retaining ring 24 at the location of the oil-replenishing pipe 102. The oil-replenishing pipe 102 passes through an opening in the elastic circular body 10 and the through hole. An external thread 104 is on the external surface of the oil-replenishing pipe 102. The oil-replenishing pipe 102 is tightly locked and fixed to the retaining ring 24 by securing a nut 105 to the external thread 104. The retaining ring 24 can limit the elastic circular body 10, secure the elastic circular body 10 in place, and better support and fix the oil-replenishing pipe 102. Referring to FIG. 3, the other end of the oil-replenishing pipe 102 comprises an integral sealing circular body 103. The sealing circular body 103 of the oil-replenishing pipe 102 is in the cavity 101 of the elastic circular body 10 and tightly fits with the inner wall of the elastic circular body 10 at the oil inlet. The sealing circular body 103 of the oil-replenishing pipe 102 can tightly fit with the inner wall of the elastic circular body 10 at the oil inlet under the pressure of the oil in the cavity 101, thereby avoiding leakage of the pressurized oil.

In one implementation, the elastic circular body 10 has a side or surface facing the annular shell plate 13 that comprises a concave-convex or stepped structure, as shown in FIG. 3. The concave-convex or stepped structure contacts the annular shell plate 13 so as to cooperate with the annular shell plate 13 and improve scaling.

Example 5

This example provides a wind power generation system, including a power generation module. The power generation module includes a wind driven generator stator, a wind driven generator rotor, and the above sliding bearing. The wind driven generator stator and the wind driven generator rotor are connected to the sliding bearing, respectively, and rotate relative to each other via the sliding bearing.

In a more perfected solution, the wind power generation system further includes a lubricant pump system and a high-pressure oil pump system. The lubricant pump system is connected to the first oil supply passage. The high-pressure oil pump system is connected to the second oil supply passage. In implementation, each of the lubricant pump system and the high-pressure oil pump system can also be respectively configured with a check valve for unidirectional delivery of the lubricant and the high-pressure oil. The lubricant pump system and the high-pressure oil pump system can be conventionally machined.

What is claimed is:

1. A wind power main-shaft sliding bearing with bidirectional stresses, comprising an outer ring, an inner ring and tile blocks, wherein:
   where the inner ring slides on the outer ring, the outer ring has a cross-section with an isosceles trapezoidal shape,
   the inner ring has a groove therein with a trapezoidal cross-section, matching the isosceles trapezoidal shape of the outer ring at the interface of the outer ting and the inner ring,
   the trapezoidal groove has sloping faces with symmetrical chutes therein,
   each of the chutes contains one of the tile blocks,
   each of the tile blocks has a spherical face facing the inner ring,
   each of the tile blocks has a working face facing the outer ring,
   each of the tile blocks separates a first oil cavity and a second oil cavity, the first oil cavity is between the outer ring and the tile blocks, the second oil cavity is between the inner ring and the tile blocks, the first oil cavity includes a lubricant, and the second oil cavity includes an oil,
   the inner ring includes a first oil supply passage and a second oil supply passage, the first oil supply passage is in communication with the first oil cavity, and the second oil supply passage is in communication with the second oil cavity, and
   each of the tile blocks includes a first oil supply passage comprising a first flow channel in the inner ring, a second flow channel in the corresponding tile block, and a communicating component, the second flow channel is in a radial direction of the spherical face, the second flow channel has one end in communication with the communicating component on the spherical face and another end that passes through the working face of the tile block and is in communication with the first oil cavity, the communicating component is in the second oil cavity and is in communication with the first flow channel, and the communicating component is flexible.

2. The wind power main-shaft sliding bearing according to claim 1, wherein the tile block also includes a unidirectional structure; the unidirectional structure comprises a sliding channel, a slider, a spring, and a joint adapted to the sliding channel; the sliding channel and the second flow channel are in the tile block; the sliding channel has one end opening through the spherical face of the tile block and another end that does not pass through the tile block; the second flow channel has one end opening through the working face of the tile block and in communication with the first oil cavity, and another end in communication with the sliding channel; the joint has one end connected to the sliding channel and another end connected to the communicating component; the spring and the slider are both in the sliding channel, the spring is between a bottom of the sliding channel and the slider, the slider is between the spring and the joint, the slider is adapted to and movable along the sliding channel; and initially, the spring presses the slider against the joint, and the slider blocks the second flow channel.

3. The wind power main-shaft sliding bearing according to claim 2, wherein the slider includes a balancing passage, the balancing passage has one end passing through a side wall of the slider and another end passing through a first end of the slider facing the spring; the first end of the slider has a pressure-bearing area smaller than that of a second end of the slider; when the spring forces the slider against the joint, the balancing passage is in communication with the second flow channel; when pressure of the lubricant moves the slider in the sliding channel, the second flow channel is in communication with the communicating component, and the balancing passage is in communication with the second flow channel.

4. The wind power main-shaft sliding bearing according to claim 1, further comprising a follower member and an elastic member, wherein the follower member comprises a first circular body adapted to the chute, a second circular body adapted to the spherical face of the tile block, and a support circle; the first circular body and the second circular body are connected to the support circle; the first circular body, the second circular body, and the support circle jointly enclose an annular receiving cavity; the first circular body comprises a first sealing face fitting an inner surface of the chute and a beveled or arc face away from the first sealing face; the second circular body comprises a second sealing face fitting the spherical face of the tile block; the follower member is inside the chute; the elastic member is inside the chute and has an upper end in a receiving cavity of the follower member, contacting (i) the support circle or (ii) the first circular body and the second circular body, and a lower end contacting a bottom of the chute.

5. A wind power main-shaft sliding bearing with bidirectional stresses, comprising an outer ring, an inner ring, tile blocks and a guide seat, wherein:
  where the inner ring slides on the outer ring, the outer ring has a cross-section with an isosceles trapezoidal shape,
  the inner ring has a groove therein with a trapezoidal cross-section, matching the isosceles trapezoidal shape of the outer ring at the interface of the outer ting and the inner ring,
  the trapezoidal groove has sloping faces with symmetrical chutes therein,
  each of the chutes contains one of the tile blocks,
  each of the tile blocks has a spherical face facing the inner ring,
  each of the tile blocks has a working face facing the outer ring,
  each of the tile blocks separates a first oil cavity and a second oil cavity, the first oil cavity is between the outer ring and the tile blocks, the first oil cavity includes a lubricant, and the second oil cavity includes an oil,
  the inner ring includes a first oil supply passage and a second oil supply passage, the first oil supply passage is in communication with the first oil cavity, and the second oil supply passage is in communication with the second oil cavity, and
  each of the tile blocks includes a first oil supply passage comprising a first flow channel in the inner ring,
  the guide seat is constructed or adapted to the chute;
  the guide seat and the chute form a moving pair in a depth direction of the chute;
  the second oil cavity is between a lower end of the guide seat and the chute;
  the guide seat has an inner concave face that is spherical and adapted to the spherical face of the tile block;
  the tile block is mounted on the inner concave face of the guide seat;
  the spherical face of the tile block and the inner concave face of the guide seat form a spherical face pair;
  the first oil supply passage comprises a first flow channel in the inner ring, a vertical flow channel in an inside wall of the chute, a transverse flow channel in the guide seat, a circular groove in the inner concave face, and at least four second flow channels in the tile block;
  the vertical flow channel is in a depth direction of the chute;
  the first flow channel is in communication with the vertical flow channel;
  the transverse flow channel has one end in a side wall of the guide seat that forms an inlet in the side wall of the guide seat;
  the inlet corresponds to the vertical flow channel and is in communication with the vertical flow channel;
  the circular groove is at a center of the inner concave face;
  the transverse flow channel has another end in communication with the circular groove;
  ends of each of the second flow channels open through the working face and the spherical face of the tile block, respectively;
  each of the second flow channels is in communication with the circular groove;
  one of the second flow channels is at a center of the tile block, the remaining second flow channels are uniformly distributed in a circumferential direction around the one second flow channel, and spacings between the second flow channels gradually increase along a direction from the guide seat to the first oil cavity;
  the vertical flow channel has an upper end opening through an outer annular face of the inner ring; and
  the guide seat includes a limiting protrusion at a side thereof, adapted to the vertical flow channel and movably constrained in the vertical flow channel.

6. The wind power main-shaft sliding bearing according to claim 5, further comprising a unidirectional structure at the transverse flow channel in the guide seat, comprising a sliding channel, a communicating passage, a slider, a spring, and a limiting member; the sliding channel is in the guide seat and has one end open through a side wall of the guide seat to form an inlet and another end that does not pass through the guide seat; the communicating passage has one end in communication with the circular groove and another end connected to a middle of the sliding channel; the limiting member is cylindrical and threadedly connected to the inlet; the spring and the slider are both inside the sliding channel, the spring is between a bottom of the sliding channel and the slider, the slider is between the spring and the limiting member, and the slider and the sliding channel are constructed as a moving pair; and initially, the spring presses the slider against the limiting member, and the slider blocks the communicating passage.

7. The wind power main-shaft sliding bearing according to claim 6, wherein the slider includes a balancing passage, the balancing passage has one end passing through a side wall of the slider, and another end passing through a first end of the slider facing the spring, the first end of the slider has a pressure-bearing area smaller than that of a second end of the slider; when the spring forces the slider against the limiting member, the balancing passage is in communication with the transverse flow channel; when pressure of the lubricant moves the slider in the sliding channel, the vertical flow channel is in communication with the transverse flow channel, and the balancing passage is in communication with the transverse flow channel.

8. The wind power main-shaft sliding bearing according to claim 6, wherein the limiting member has an end facing the slider with a conical hole therein, the slider has a conical head adapted to the conical hole, and initially, the spring presses the conical head of the slider against the conical hole in the limiting member.

9. A wind power main-shaft sliding bearing with bidirectional stresses, comprising an outer ring, an inner ring, tile blocks and a guide seat, wherein:
  where the inner ring slides on the outer ring, the outer ring has a cross-section with an isosceles trapezoidal shape,
  the inner ring has a groove therein with a trapezoidal cross-section, matching the isosceles trapezoidal shape of the outer ring at the interface of the outer ting and the inner ring,
  the trapezoidal groove has sloping faces with symmetrical chutes therein,
  each of the chutes contains one of the tile blocks,
  each of the tile blocks has a spherical face facing the inner ring,
  each of the tile blocks has a working face facing the outer ring,
  each of the tile blocks separates a first oil cavity and a second oil cavity, the first oil cavity is between the outer ring and the tile blocks, the first oil cavity includes a lubricant, and the second oil cavity includes an oil, the inner ring includes a first oil supply passage and a second oil supply passage, the first oil supply passage is in communication with the first oil cavity, and the second oil supply passage is in communication with the second oil cavity, and each of the tile blocks includes a first oil supply passage comprising a first flow channel in the inner ring, the guide seat is constructed or adapted to the chute;

the guide seat and the chute form a moving pair in a depth direction of the chute;

the second oil cavity is between a lower end of the guide seat and the chute;

the guide seat has an inner concave face that is spherical and adapted to the spherical face of the tile block;

the tile block is mounted on the inner concave face of the guide seat;

the spherical face of the tile block and the inner concave face of the guide seat form a spherical face pair;

the first oil supply passage comprises a first flow channel in the inner ring, a vertical flow channel in an inside wall of the chute, a transverse flow channel in the guide seat, a circular groove in the inner concave face, and a second flow channel in the tile block;

the vertical flow channel is in a depth direction of the chute;

the first flow channel is in communication with the vertical flow channel;

the transverse flow channel has one end in a side wall of the guide seat that forms an inlet in the side wall of the guide seat;

the inlet corresponds to the vertical flow channel and is in communication with the vertical flow channel;

the circular groove is at a center of the inner concave face;

the transverse flow channel has another end in communication with the circular groove;

ends of the second flow channel open through the working face and the spherical face of the tile block, respectively;

the second flow channel is in communication with the circular groove;

the chute contains an elastic member;

the guide seat has a spherical lower end or face;

the wind power main-shaft sliding bearing further comprises a follower member at a bottom of the guide seat;

the follower member comprises a first circular body adapted to and inside the chute, a second circular body adapted to the spherical face of the tile block, and a support circle;

the first circular body and the second circular body are connected to the support circle;

the first circular body, the second circular body, and the support circle jointly enclose an annular receiving cavity;

the first circular body comprises a first sealing face fitting an inner surface of the chute and a beveled or arc face away from the first sealing face;

the second circular body comprises a second sealing face fitting the spherical face of the guide seat; and the elastic member has an upper end in a receiving cavity of the follower member, contacting (i) the support circle or (ii) the first circular body and the second circular body, and a lower end contacting a bottom of the chute.

10. The wind power main-shaft sliding bearing according to claim 9, wherein the second circular body includes a ring-shaped protrusion that forms an annular slot inside the second circular body, and the wind power main-shaft sliding bearing further comprises a circular spring in the annular slot.

* * * * *